(12) United States Patent
Weaver et al.

(10) Patent No.: US 7,819,192 B2
(45) Date of Patent: Oct. 26, 2010

(54) CONSOLIDATING AGENT EMULSIONS AND ASSOCIATED METHODS

(75) Inventors: Jimmie D. Weaver, Duncan, OK (US);
Philip D. Nguyen, Duncan, OK (US);
Thomas E. Rush, Richmond, TX (US);
Billy F. Slabaugh, Duncan, OK (US);
Bobby K. Bowles, Comanche, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 11/351,931

(22) Filed: Feb. 10, 2006

(65) Prior Publication Data

US 2007/0187097 A1    Aug. 16, 2007

(51) Int. Cl.
*E21B 33/13* (2006.01)
*E21B 43/267* (2006.01)

(52) U.S. Cl. .................. 166/292; 166/280.2; 166/295

(58) Field of Classification Search .................. None
See application file for complete search history.

(56) References Cited

U.S. PATENT DOCUMENTS

| | | | |
|---|---|---|---|
| 2,238,671 A | 4/1941 | Woodhouse | |
| 2,604,947 A * | 7/1952 | Martin | 166/270 |
| 2,611,750 A | 9/1952 | White et al. | |
| 2,703,316 A | 3/1955 | Schneider | |
| 2,869,642 A | 1/1959 | McKay et al. | |
| 3,047,067 A | 7/1962 | Williams et al. | |
| 3,052,298 A | 9/1962 | Malott | |
| 3,070,165 A | 12/1962 | Stratton | |
| 3,123,138 A | 3/1964 | Robichaux | |
| 3,173,484 A | 3/1965 | Huitt et al. | |
| 3,176,768 A | 4/1965 | Brandt et al. | |
| 3,195,635 A | 7/1965 | Fast | |
| 3,199,590 A | 8/1965 | Young | |
| 3,272,650 A | 9/1966 | MacVittie | |
| 3,297,086 A | 1/1967 | Spain | |
| 3,302,719 A | 2/1967 | Fischer | |
| 3,308,885 A | 3/1967 | Sandiford | |
| 3,308,886 A | 3/1967 | Evans | |
| 3,310,111 A | 3/1967 | Pavlich et al. | |
| 3,316,965 A | 5/1967 | Watanabe | |
| 3,329,204 A | 7/1967 | Brieger | |
| 3,336,980 A | 8/1967 | Rike | |
| 3,364,995 A | 1/1968 | Atkins et al. | |
| 3,366,178 A | 1/1968 | Malone et al. | |
| 3,371,712 A * | 3/1968 | Adams | 166/295 |
| 3,375,872 A | 4/1968 | McLaughlin et al. | |
| 3,378,074 A | 4/1968 | Kiel | |
| 3,404,735 A | 10/1968 | Young et al. | |
| 3,415,320 A | 12/1968 | Young | |
| 3,455,390 A | 7/1969 | Gallus | |
| 3,478,824 A | 11/1969 | Hess et al. | |
| 3,481,403 A | 12/1969 | Gidley et al. | |
| 3,489,222 A | 1/1970 | Millhone et al. | |
| 3,492,147 A | 1/1970 | Young et al. | |
| 3,525,398 A | 8/1970 | Fisher | |
| 3,565,176 A | 2/1971 | Clifford | |
| 3,592,266 A | 7/1971 | Tinsley | |
| 3,659,651 A | 5/1972 | Graham | |
| 3,681,287 A | 8/1972 | Brown et al. | |
| 3,708,013 A | 1/1973 | Dismukes | |
| 3,709,298 A | 1/1973 | Pramann | |
| 3,709,641 A | 1/1973 | Sarem | |
| 3,741,308 A | 6/1973 | Veley | |
| 3,743,019 A | 7/1973 | Totty | |
| 3,754,598 A | 8/1973 | Holloway, Jr. | |
| 3,765,804 A | 10/1973 | Brandon | |
| 3,768,564 A | 10/1973 | Knox et al. | |
| 3,769,070 A | 10/1973 | Schilt | |
| 3,784,585 A | 1/1974 | Schmitt et al. | |
| 3,819,525 A | 6/1974 | Hattenbrun | |

(Continued)

FOREIGN PATENT DOCUMENTS

CA    2063877    9/1992

(Continued)

OTHER PUBLICATIONS

Office action dated Apr. 7, 2008 from U.S. Appl. No. 11/880,230.

(Continued)

*Primary Examiner*—Zakiya W Bates
*Assistant Examiner*—Angela M Ditrani
(74) *Attorney, Agent, or Firm*—Robert A. Kent; McDermott Will & Emery LLP

(57) ABSTRACT

Methods comprising: providing a consolidating agent emulsion composition that comprises an aqueous fluid, a surfactant, and a consolidating agent; and coating at least a plurality of particulates with the consolidating agent emulsion to produce a plurality of consolidating agent emulsion coated particulates. Methods comprising: providing a treatment fluid comprising a consolidating agent emulsion comprising an aqueous fluid, an amine surfactant, and a consolidating agent; and introducing the treatment fluid into a subterranean formation. Methods comprising the steps of: coating a plurality of particulates with a consolidating agent emulsion to produce consolidating agent emulsion coated particulates; providing a treatment fluid comprising an aqueous fluid, a surfactant, and a consolidating agent; introducing the treatment fluid into a subterranean formation. Consolidating agent emulsion compositions comprising: an aqueous fluid; a surfactant; and a consolidating agent comprising a non-aqueous tackifying agent or resin.

14 Claims, 2 Drawing Sheets

U.S. PATENT DOCUMENTS

| | | | |
|---|---|---|---|
| 3,826,310 A * | 7/1974 | Karnes | 166/276 |
| 3,828,854 A | 8/1974 | Templeton et al. | |
| 3,842,911 A | 10/1974 | Knox et al. | |
| 3,850,247 A | 11/1974 | Tinsley | |
| 3,854,533 A | 12/1974 | Gurley et al. | |
| 3,857,444 A | 12/1974 | Copeland | |
| 3,861,467 A | 1/1975 | Harnsberger | |
| 3,863,709 A | 2/1975 | Fitch | |
| 3,868,998 A | 3/1975 | Lybarger et al. | |
| 3,878,893 A | 4/1975 | Copeland | |
| 3,888,311 A | 6/1975 | Cooke, Jr. | |
| 3,912,692 A | 10/1975 | Casey et al. | |
| 3,933,204 A * | 1/1976 | Knapp | 166/295 |
| 3,933,205 A | 1/1976 | Kiel | |
| 3,948,672 A | 4/1976 | Harnsberger | |
| 3,955,993 A | 5/1976 | Curtice et al. | |
| 3,960,736 A | 6/1976 | Free et al. | |
| 3,976,135 A * | 8/1976 | Anderson | 166/276 |
| 3,977,472 A * | 8/1976 | Graham et al. | 166/283 |
| 4,000,781 A | 1/1977 | Knapp | 166/276 |
| 4,008,763 A | 2/1977 | Lowe, Jr. | |
| 4,015,995 A | 4/1977 | Hess | |
| 4,018,285 A | 4/1977 | Watkins et al. | |
| 4,029,148 A | 6/1977 | Emery | |
| 4,031,958 A | 6/1977 | Sandiford et al. | |
| 4,042,032 A | 8/1977 | Anderson et al. | |
| 4,060,988 A | 12/1977 | Arnold | |
| 4,068,718 A | 1/1978 | Cooke, Jr. et al. | |
| 4,070,865 A | 1/1978 | McLaughlin | |
| 4,074,760 A | 2/1978 | Copeland et al. | |
| 4,085,801 A | 4/1978 | Sifferman et al. | |
| 4,085,802 A | 4/1978 | Sifferman et al. | |
| 4,089,437 A | 5/1978 | Chutter et al. | |
| 4,127,173 A | 11/1978 | Watkins et al. | |
| 4,169,798 A | 10/1979 | DeMartino | |
| 4,172,066 A | 10/1979 | Zweigle et al. | |
| 4,220,566 A | 9/1980 | Constien et al. | 260/13 |
| 4,245,702 A | 1/1981 | Haafkens et al. | |
| 4,247,430 A | 1/1981 | Constien | |
| 4,259,205 A | 3/1981 | Murphey | |
| 4,273,187 A | 6/1981 | Satter et al. | |
| 4,291,766 A | 9/1981 | Davies et al. | |
| 4,305,463 A | 12/1981 | Zakiewicz | |
| 4,336,842 A | 6/1982 | Graham et al. | |
| 4,352,674 A | 10/1982 | Fery | |
| 4,353,806 A | 10/1982 | Canter et al. | |
| 4,387,769 A | 6/1983 | Erbstoesser et al. | |
| 4,392,988 A | 7/1983 | Dobson et al. | |
| 4,399,866 A | 8/1983 | Dearth | |
| 4,415,805 A | 11/1983 | Fertl et al. | |
| 4,428,427 A | 1/1984 | Friedman | |
| 4,439,489 A | 3/1984 | Johnson et al. | |
| 4,441,556 A | 4/1984 | Powers et al. | |
| 4,443,347 A | 4/1984 | Underdown et al. | |
| 4,460,052 A | 7/1984 | Gockel | |
| 4,470,915 A | 9/1984 | Conway | |
| 4,493,875 A | 1/1985 | Beck et al. | |
| 4,494,605 A | 1/1985 | Wiechel et al. | |
| 4,498,995 A | 2/1985 | Gockel et al. | |
| 4,501,328 A | 2/1985 | Nichols | |
| 4,526,695 A | 7/1985 | Erbstoesser et al. | |
| 4,527,627 A | 7/1985 | Graham et al. | |
| 4,541,489 A | 9/1985 | Wu | |
| 4,546,012 A | 10/1985 | Brooks | |
| 4,553,596 A | 11/1985 | Graham et al. | |
| 4,564,459 A | 1/1986 | Underdown et al. | |
| 4,572,803 A | 2/1986 | Yamazoe et al. | |
| 4,585,064 A | 4/1986 | Graham et al. | |
| 4,649,998 A | 3/1987 | Friedman | |
| 4,662,449 A * | 5/1987 | Friedman | 166/295 |
| 4,664,819 A | 5/1987 | Glaze et al. | |
| 4,665,988 A | 5/1987 | Murphey et al. | |
| 4,669,543 A | 6/1987 | Young | |
| 4,670,501 A | 6/1987 | Dymond et al. | |
| 4,675,140 A | 6/1987 | Sparks et al. | |
| 4,681,165 A | 7/1987 | Bannister | |
| 4,683,954 A | 8/1987 | Walker et al. | |
| 4,694,905 A | 9/1987 | Armbruster | |
| 4,715,967 A | 12/1987 | Bellis | |
| 4,716,964 A | 1/1988 | Erbstoesser et al. | |
| 4,733,729 A | 3/1988 | Copeland | |
| 4,739,832 A | 4/1988 | Jennings, Jr. et al. | |
| 4,772,646 A | 9/1988 | Harms et al. | |
| 4,777,200 A | 10/1988 | Dymond et al. | |
| 4,785,884 A | 11/1988 | Armbruster | |
| 4,787,453 A | 11/1988 | Hewgill et al. | |
| 4,789,105 A | 12/1988 | Hosokawa et al. | |
| 4,796,701 A | 1/1989 | Hudson et al. | |
| 4,797,262 A | 1/1989 | Dewitz | |
| 4,800,960 A | 1/1989 | Friedman et al. | |
| 4,809,783 A | 3/1989 | Hollenbeck et al. | |
| 4,817,721 A | 4/1989 | Pober | |
| 4,829,100 A | 5/1989 | Murphey et al. | |
| 4,838,352 A | 6/1989 | Oberste-Padtberg et al. | |
| 4,842,070 A | 6/1989 | Sharp | |
| 4,842,072 A | 6/1989 | Friedman et al. | |
| 4,846,118 A | 7/1989 | Slattery et al. | |
| 4,848,467 A | 7/1989 | Cantu et al. | |
| 4,848,470 A | 7/1989 | Korpics | |
| 4,850,430 A | 7/1989 | Copeland et al. | |
| 4,875,525 A | 10/1989 | Mana | |
| 4,886,354 A | 12/1989 | Welch et al. | |
| 4,888,240 A | 12/1989 | Graham et al. | |
| 4,892,147 A | 1/1990 | Jennings, Jr. et al. | |
| 4,895,207 A | 1/1990 | Friedman et al. | |
| 4,898,750 A | 2/1990 | Friedman et al. | |
| 4,903,770 A | 2/1990 | Friedman et al. | |
| 4,921,576 A | 5/1990 | Hurd | |
| 4,934,456 A | 6/1990 | Moradi-Araghi | |
| 4,936,385 A | 6/1990 | Weaver et al. | |
| 4,942,186 A | 7/1990 | Murphey et al. | |
| 4,957,165 A | 9/1990 | Cantu et al. | |
| 4,959,432 A | 9/1990 | Fan et al. | |
| 4,961,466 A | 10/1990 | Himes et al. | |
| 4,969,522 A | 11/1990 | Whitehurst et al. | |
| 4,969,523 A | 11/1990 | Martin et al. | |
| 4,984,635 A | 1/1991 | Cullick et al. | |
| 4,986,353 A | 1/1991 | Clark et al. | |
| 4,986,354 A | 1/1991 | Cantu et al. | |
| 4,986,355 A | 1/1991 | Casad et al. | |
| 5,030,603 A | 7/1991 | Rumpf et al. | |
| 5,049,743 A | 9/1991 | Taylor, III et al. | |
| 5,056,597 A | 10/1991 | Stowe, III et al. | |
| 5,082,056 A | 1/1992 | Tackett, Jr. et al. | |
| 5,095,987 A | 3/1992 | Weaver et al. | |
| 5,105,886 A * | 4/1992 | Strubhar et al. | 166/280.1 |
| 5,107,928 A | 4/1992 | Hilterhaus | |
| 5,128,390 A | 7/1992 | Murphey et al. | |
| 5,135,051 A | 8/1992 | Facteau et al. | |
| 5,142,023 A | 8/1992 | Gruber et al. | |
| 5,165,438 A | 11/1992 | Facteau et al. | |
| 5,173,527 A | 12/1992 | Calve et al. | |
| 5,178,218 A | 1/1993 | Dees | |
| 5,182,051 A | 1/1993 | Bandy et al. | |
| 5,199,491 A | 4/1993 | Kutta et al. | |
| 5,199,492 A | 4/1993 | Surles et al. | |
| 5,211,234 A | 5/1993 | Floyd | |
| 5,216,050 A | 6/1993 | Sinclair | |
| 5,218,038 A | 6/1993 | Johnson et al. | |
| 5,232,955 A | 8/1993 | Csabai et al. | |
| 5,232,961 A | 8/1993 | Murphey et al. | |
| 5,238,068 A | 8/1993 | Fredrickson et al. | |
| 5,244,362 A | 9/1993 | Conally et al. | |
| 5,247,059 A | 9/1993 | Gruber et al. | |

| | | | | | |
|---|---|---|---|---|---|
| 5,249,627 A | 10/1993 | Harms et al. | 5,692,566 A | 12/1997 | Surles |
| 5,249,628 A | 10/1993 | Surjaatmadia | 5,697,440 A | 12/1997 | Weaver et al. |
| 5,256,729 A | 10/1993 | Kutta et al. | 5,697,448 A | 12/1997 | Johnson |
| 5,265,678 A | 11/1993 | Grundmann | 5,698,322 A | 12/1997 | Tsai et al. |
| 5,273,115 A | 12/1993 | Spafford | 5,701,956 A | 12/1997 | Hardy et al. |
| 5,278,203 A | 1/1994 | Harms | 5,712,314 A | 1/1998 | Surles et al. |
| 5,285,849 A | 2/1994 | Surles et al. | 5,732,364 A | 3/1998 | Kalb et al. |
| 5,293,939 A | 3/1994 | Surles et al. | 5,738,136 A | 4/1998 | Rosenberg |
| 5,295,542 A | 3/1994 | Cole et al. | 5,765,642 A | 6/1998 | Surjaatmadja |
| 5,320,171 A | 6/1994 | Laramay | 5,775,425 A | 7/1998 | Weaver et al. |
| 5,321,062 A | 6/1994 | Landrum et al. | 5,782,300 A | 7/1998 | James et al. |
| 5,325,923 A | 7/1994 | Surjaatmadja et al. | 5,783,822 A | 7/1998 | Buchanan et al. |
| 5,330,005 A | 7/1994 | Card et al. | 5,787,986 A | 8/1998 | Weaver et al. |
| 5,332,037 A | 7/1994 | Schmidt et al. | 5,791,415 A | 8/1998 | Nguyen et al. |
| 5,335,726 A | 8/1994 | Rodrigues | 5,799,734 A | 9/1998 | Norman et al. |
| 5,351,754 A | 10/1994 | Hardin et al. | 5,806,593 A | 9/1998 | Surles |
| 5,358,051 A | 10/1994 | Rodrigues | 5,830,987 A | 11/1998 | Smith |
| 5,359,026 A | 10/1994 | Gruber | 5,833,000 A | 11/1998 | Weaver et al. ............... 166/276 |
| 5,360,068 A | 11/1994 | Sprunt et al. | 5,833,361 A | 11/1998 | Funk |
| 5,361,856 A | 11/1994 | Surjaatmadja et al. | 5,836,391 A | 11/1998 | Jonasson et al. |
| 5,363,916 A | 11/1994 | Himes et al. | 5,836,392 A | 11/1998 | Urlwin-Smith |
| 5,373,901 A | 12/1994 | Norman et al. | 5,836,393 A | 11/1998 | Johnson |
| 5,377,756 A | 1/1995 | Northrop et al. | 5,837,656 A | 11/1998 | Sinclair et al. |
| 5,377,759 A | 1/1995 | Surles | 5,837,785 A | 11/1998 | Kinsho et al. |
| 5,381,864 A | 1/1995 | Nguyen et al. | 5,839,510 A | 11/1998 | Weaver et al. ............... 166/276 |
| 5,386,874 A | 2/1995 | Laramay et al. | 5,840,784 A | 11/1998 | Funkhouser et al. |
| 5,388,648 A | 2/1995 | Jordan, Jr. | 5,849,401 A | 12/1998 | El-Afandi et al. |
| 5,390,741 A | 2/1995 | Payton et al. | 5,849,590 A | 12/1998 | Anderson, II et al. |
| 5,393,810 A | 2/1995 | Harris et al. | 5,853,048 A | 12/1998 | Weaver et al. ............... 166/279 |
| 5,396,957 A | 3/1995 | Surjaatmadja et al. | 5,864,003 A | 1/1999 | Qureshi et al. |
| 5,402,846 A | 4/1995 | Jennings, Jr. et al. | 5,865,936 A | 2/1999 | Edelman et al. |
| 5,403,822 A | 4/1995 | Mueller et al. | 5,871,049 A | 2/1999 | Weaver et al. |
| 5,420,174 A | 5/1995 | Dewprashad | 5,873,413 A | 2/1999 | Chatterji et al. |
| 5,422,183 A | 6/1995 | Sinclair et al. | 5,874,490 A | 2/1999 | Arora et al. |
| 5,423,381 A | 6/1995 | Surles et al. | 5,875,844 A | 3/1999 | Chatterji et al. |
| 5,439,055 A | 8/1995 | Card et al. | 5,875,845 A | 3/1999 | Chatterji et al. |
| 5,460,226 A | 10/1995 | Lawton et al. | 5,875,846 A | 3/1999 | Chatterji et al. |
| 5,464,060 A | 11/1995 | Hale et al. | 5,893,383 A | 4/1999 | Fracteau |
| 5,475,080 A | 12/1995 | Gruber et al. | 5,893,416 A | 4/1999 | Read |
| 5,484,881 A | 1/1996 | Gruber et al. | 5,901,789 A | 5/1999 | Donnelly et al. |
| 5,492,177 A | 2/1996 | Yeh et al. | 5,908,073 A | 6/1999 | Nguyen et al. |
| 5,492,178 A | 2/1996 | Nguyen et al. | 5,911,282 A | 6/1999 | Onan et al. |
| 5,494,103 A | 2/1996 | Surjaatmadja et al. | 5,913,364 A | 6/1999 | Sweatman |
| 5,494,178 A | 2/1996 | Maharg | 5,916,933 A | 6/1999 | Johnson et al. |
| 5,497,830 A | 3/1996 | Boles et al. | 5,921,317 A | 7/1999 | Dewprashad et al. |
| 5,498,280 A | 3/1996 | Fistner et al. | 5,924,488 A | 7/1999 | Nguyen et al. |
| 5,499,678 A | 3/1996 | Surjaatmadja et al. | 5,929,437 A | 7/1999 | Elliott et al. |
| 5,501,275 A | 3/1996 | Card et al. | 5,944,105 A | 8/1999 | Nguyen |
| 5,505,787 A | 4/1996 | Yamaguchi | 5,944,106 A | 8/1999 | Dalrymple et al. |
| 5,512,071 A | 4/1996 | Yam et al. | 5,945,387 A | 8/1999 | Chatterji et al. |
| 5,520,250 A | 5/1996 | Harry et al. | 5,948,734 A | 9/1999 | Sinclair et al. |
| 5,522,460 A | 6/1996 | Shu | 5,957,204 A | 9/1999 | Chatterji et al. |
| 5,529,123 A | 6/1996 | Carpenter et al. | 5,960,784 A | 10/1999 | Ryan |
| 5,531,274 A | 7/1996 | Bienvenu, Jr. | 5,960,877 A | 10/1999 | Funkhouser et al. |
| 5,536,807 A | 7/1996 | Gruber et al. | 5,960,878 A | 10/1999 | Nguyen et al. |
| 5,545,824 A | 8/1996 | Stengel et al. | 5,960,880 A | 10/1999 | Nguyen et al. |
| 5,547,023 A | 8/1996 | McDaniel et al. | 5,964,291 A | 10/1999 | Bourne et al. |
| 5,551,513 A | 9/1996 | Surles et al. | 5,969,006 A | 10/1999 | Onan et al. |
| 5,551,514 A | 9/1996 | Nelson et al. | 5,969,523 A | 10/1999 | Martin et al. |
| 5,582,249 A * | 12/1996 | Caveny et al. ............... 166/276 | 5,969,823 A | 10/1999 | Wurz et al. |
| 5,582,250 A | 12/1996 | Constien | 5,977,283 A | 11/1999 | Rossitto |
| 5,588,488 A | 12/1996 | Vijn et al. | 5,994,785 A | 11/1999 | Higuchi et al. |
| 5,591,700 A | 1/1997 | Harris et al. | RE36,466 E | 12/1999 | Nelson et al. |
| 5,594,095 A | 1/1997 | Gruber et al. | 6,003,600 A | 12/1999 | Nguyen et al. |
| 5,595,245 A | 1/1997 | Scott, III | 6,004,400 A | 12/1999 | Bishop et al. |
| 5,597,784 A | 1/1997 | Sinclair et al. | 6,006,835 A | 12/1999 | Onan et al. |
| 5,604,184 A | 2/1997 | Ellis et al. | 6,006,836 A | 12/1999 | Chatterji et al. |
| 5,604,186 A | 2/1997 | Hunt et al. | 6,012,524 A | 1/2000 | Chatterji et al. |
| 5,609,207 A | 3/1997 | Dewprashad et al. | 6,016,870 A | 1/2000 | Dewprashad et al. |
| 5,620,049 A | 4/1997 | Gipson et al. | 6,024,170 A | 2/2000 | McCabe et al. |
| 5,639,806 A | 6/1997 | Johnson et al. | 6,028,113 A | 2/2000 | Scepanski |
| 5,663,123 A | 9/1997 | Goodhue, Jr. et al. | 6,028,534 A | 2/2000 | Ciglenec et al. |
| 5,670,473 A | 9/1997 | Scepanski | 6,035,936 A * | 3/2000 | Whalen ................ 166/308.3 |

| | | | |
|---|---|---|---|
| 6,040,398 A | 3/2000 | Kinsho et al. | |
| 6,047,772 A | 4/2000 | Weaver et al. | |
| 6,059,034 A | 5/2000 | Rickards et al. | |
| 6,059,035 A | 5/2000 | Chatterji et al. | |
| 6,059,036 A | 5/2000 | Chatterji et al. | |
| 6,063,738 A | 5/2000 | Chatterji et al. | |
| 6,068,055 A | 5/2000 | Chatterji et al. | |
| 6,069,117 A | 5/2000 | Onan et al. | |
| 6,070,667 A | 6/2000 | Gano | |
| 6,074,739 A | 6/2000 | Katagiri | |
| 6,079,492 A | 6/2000 | Hoogteijling et al. | |
| 6,098,711 A | 8/2000 | Chatterji et al. | |
| 6,114,410 A | 9/2000 | Betzold | |
| 6,123,871 A | 9/2000 | Carroll | |
| 6,123,965 A | 9/2000 | Jacob et al. | |
| 6,124,246 A | 9/2000 | Heathman et al. | |
| 6,130,286 A | 10/2000 | Thomas et al. | |
| 6,131,661 A | 10/2000 | Conner et al. | |
| 6,135,987 A | 10/2000 | Tsai et al. | |
| 6,140,446 A | 10/2000 | Fujiki et al. | |
| 6,143,698 A | 11/2000 | Murphey et al. | |
| 6,148,911 A | 11/2000 | Gipson et al. | |
| 6,152,234 A | 11/2000 | Newhouse et al. | |
| 6,162,766 A | 12/2000 | Muir et al. | |
| 6,165,947 A | 12/2000 | Chang et al. | |
| 6,167,967 B1 | 1/2001 | Sweatman | |
| 6,169,058 B1 | 1/2001 | Le et al. | |
| 6,172,011 B1 | 1/2001 | Card et al. | |
| 6,172,077 B1 | 1/2001 | Curtis et al. | |
| 6,176,315 B1 | 1/2001 | Reddy et al. | |
| 6,177,484 B1 | 1/2001 | Surles | |
| 6,184,311 B1 | 2/2001 | O'Keeffe et al. | |
| 6,186,228 B1 | 2/2001 | Wegener et al. | |
| 6,187,834 B1 | 2/2001 | Thayer et al. | |
| 6,187,839 B1 | 2/2001 | Eoff et al. | |
| 6,189,615 B1 | 2/2001 | Sydansk | |
| 6,192,985 B1 | 2/2001 | Hinkel et al. | |
| 6,192,986 B1 | 2/2001 | Urlwin-Smith | |
| 6,196,317 B1 | 3/2001 | Hardy | |
| 6,202,751 B1 | 3/2001 | Chatterji et al. | |
| 6,209,643 B1 | 4/2001 | Nguyen et al. | |
| 6,209,644 B1 | 4/2001 | Brunet | |
| 6,209,646 B1 | 4/2001 | Reddy et al. | |
| 6,210,471 B1 | 4/2001 | Craig | |
| 6,214,773 B1 | 4/2001 | Harris et al. | |
| 6,231,664 B1 | 5/2001 | Chatterji et al. | |
| 6,234,251 B1 | 5/2001 | Chatterji et al. | |
| 6,238,597 B1 | 5/2001 | Yim et al. | |
| 6,241,019 B1 | 6/2001 | Davidson et al. | |
| 6,242,390 B1 | 6/2001 | Mitchell et al. | |
| 6,244,344 B1 | 6/2001 | Chatterji et al. | |
| 6,257,335 B1 | 7/2001 | Nguyen et al. | |
| 6,258,757 B1 | 7/2001 | Sweatman et al. | |
| 6,260,622 B1 | 7/2001 | Blok et al. | |
| 6,271,181 B1 | 8/2001 | Chatterji et al. | |
| 6,274,650 B1 | 8/2001 | Cui | |
| 6,279,652 B1 | 8/2001 | Chatterji et al. | |
| 6,279,656 B1 | 8/2001 | Sinclair et al. | |
| 6,283,214 B1 | 9/2001 | Guinot et al. | |
| 6,302,207 B1 | 10/2001 | Nguyen et al. | |
| 6,306,998 B1 | 10/2001 | Kimura et al. | |
| 6,310,008 B1 | 10/2001 | Rietjens | |
| 6,311,773 B1 | 11/2001 | Todd et al. | 166/280 |
| 6,315,040 B1 | 11/2001 | Donnelly | |
| 6,321,841 B1 | 11/2001 | Eoff et al. | |
| 6,323,307 B1 | 11/2001 | Bigg et al. | |
| 6,326,458 B1 | 12/2001 | Gruber et al. | |
| 6,328,105 B1 | 12/2001 | Betzold | |
| 6,328,106 B1 | 12/2001 | Griffith et al. | |
| 6,330,916 B1 | 12/2001 | Rickards et al. | |
| 6,330,917 B2 | 12/2001 | Chatterji et al. | |
| 6,342,467 B1 | 1/2002 | Chang et al. | |
| 6,350,309 B2 | 2/2002 | Chatterji et al. | |
| 6,357,527 B1 | 3/2002 | Norman et al. | |
| 6,364,018 B1 | 4/2002 | Brannon et al. | |
| 6,364,945 B1 | 4/2002 | Chatterji et al. | |
| 6,367,165 B1 | 4/2002 | Huttlin | |
| 6,367,549 B1 | 4/2002 | Chatterji et al. | |
| 6,372,678 B1 | 4/2002 | Youngman et al. | |
| 6,376,571 B1 | 4/2002 | Chawla et al. | |
| 6,387,986 B1 | 5/2002 | Moradi-Araghi et al. | |
| 6,390,195 B1 | 5/2002 | Nguyen et al. | |
| 6,394,181 B2 | 5/2002 | Schnatzmeyer et al. | |
| 6,401,817 B1 | 6/2002 | Griffith et al. | |
| 6,405,796 B1 | 6/2002 | Meyer et al. | |
| 6,405,797 B2 | 6/2002 | Davidson et al. | |
| 6,406,789 B1 | 6/2002 | McDaniel et al. | |
| 6,408,943 B1 | 6/2002 | Schultz et al. | |
| 6,415,509 B1 | 7/2002 | Echols et al. | |
| 6,422,183 B1 | 7/2002 | Kato | |
| 6,422,314 B1 | 7/2002 | Todd et al. | |
| 6,439,309 B1 | 8/2002 | Matherly et al. | |
| 6,439,310 B1 | 8/2002 | Scott, III et al. | |
| 6,440,255 B1 | 8/2002 | Kohlhammer et al. | |
| 6,446,727 B1 | 9/2002 | Zemlak et al. | |
| 6,448,206 B1 | 9/2002 | Griffith et al. | |
| 6,450,260 B1 | 9/2002 | James et al. | |
| 6,454,003 B1 | 9/2002 | Chang et al. | |
| 6,457,518 B1 | 10/2002 | Castano-Mears et al. | |
| 6,458,885 B1 | 10/2002 | Stengel et al. | |
| 6,478,092 B2 | 11/2002 | Voll et al. | |
| 6,485,947 B1 | 11/2002 | Rajgarhia et al. | |
| 6,488,091 B1 | 12/2002 | Weaver et al. | |
| 6,488,763 B2 | 12/2002 | Brothers et al. | |
| 6,494,263 B2 | 12/2002 | Todd | |
| 6,503,870 B2 | 1/2003 | Griffith et al. | |
| 6,508,305 B1 | 1/2003 | Brannon et al. | |
| 6,510,896 B2 | 1/2003 | Bode et al. | |
| 6,520,255 B2 | 2/2003 | Tolman et al. | |
| 6,527,051 B1 | 3/2003 | Reddy et al. | |
| 6,528,157 B1 | 3/2003 | Hussain et al. | |
| 6,531,427 B1 | 3/2003 | Shuchart et al. | |
| 6,534,449 B1 | 3/2003 | Gilmour et al. | |
| 6,536,939 B1 | 3/2003 | Blue | |
| 6,538,576 B1 | 3/2003 | Schultz et al. | |
| 6,543,545 B1 | 4/2003 | Chatterji et al. | |
| 6,550,959 B2 | 4/2003 | Huber et al. | |
| 6,552,333 B1 | 4/2003 | Storm et al. | |
| 6,554,071 B1 | 4/2003 | Crook et al. | |
| 6,555,507 B2 | 4/2003 | Chatterji et al. | |
| 6,569,814 B1 | 5/2003 | Brady et al. | |
| 6,582,819 B2 | 6/2003 | McDaniel et al. | |
| 6,588,926 B2 | 7/2003 | Huber et al. | |
| 6,588,928 B2 | 7/2003 | Huber et al. | |
| 6,593,402 B2 | 7/2003 | Chatterji et al. | |
| 6,599,863 B1 | 7/2003 | Palmer et al. | |
| 6,608,162 B1 | 8/2003 | Chiu et al. | |
| 6,609,578 B2 | 8/2003 | Patel et al. | |
| 6,616,320 B2 | 9/2003 | Huber et al. | |
| 6,620,857 B2 | 9/2003 | Valet | |
| 6,626,241 B2 | 9/2003 | Nguyen | |
| 6,632,527 B1 | 10/2003 | McDaniel et al. | |
| 6,632,778 B1 * | 10/2003 | Ayoub et al. | 507/202 |
| 6,632,892 B2 | 10/2003 | Rubinsztajn et al. | |
| 6,642,309 B2 | 11/2003 | Komitsu et al. | |
| 6,648,501 B2 | 11/2003 | Huber et al. | |
| 6,659,179 B2 | 12/2003 | Nguyen | |
| 6,664,343 B2 | 12/2003 | Narisawa et al. | |
| 6,667,279 B1 | 12/2003 | Hessert et al. | |
| 6,668,926 B2 | 12/2003 | Nguyen et al. | |
| 6,669,771 B2 | 12/2003 | Tokiwa et al. | |
| 6,677,426 B2 | 1/2004 | Noro et al. | |
| 6,681,856 B1 | 1/2004 | Chatterji et al. | |
| 6,686,328 B1 | 2/2004 | Binder | |
| 6,705,400 B1 | 3/2004 | Nguyen et al. | |
| 6,705,440 B2 | 3/2004 | Nguyen et al. | |

| Patent No. | Date | Inventor |
|---|---|---|
| 6,710,019 B1 | 3/2004 | Sawdon et al. |
| 6,713,170 B1 | 3/2004 | Kaneko et al. |
| 6,725,926 B2 | 4/2004 | Nguyen et al. |
| 6,725,930 B2 | 4/2004 | Boney et al. |
| 6,725,931 B2 | 4/2004 | Nguyen et al. |
| 6,729,404 B2 | 5/2004 | Nguyen et al. |
| 6,729,405 B2 | 5/2004 | DiLullo et al. |
| 6,732,800 B2 | 5/2004 | Acock et al. |
| 6,745,159 B1 | 6/2004 | Todd et al. |
| 6,749,025 B1 | 6/2004 | Brannon et al. |
| 6,753,299 B2 | 6/2004 | Longhofer et al. |
| 6,763,888 B1 | 7/2004 | Harris et al. |
| 6,764,981 B1 | 7/2004 | Eoff et al. |
| 6,766,858 B2 | 7/2004 | Nguyen et al. |
| 6,776,235 B1 | 8/2004 | England |
| 6,776,236 B1 | 8/2004 | Nguyen |
| 6,920,929 B2 | 9/2004 | Nguyen et al. |
| 6,817,414 B2 | 11/2004 | Lee |
| 6,830,105 B2 | 12/2004 | Thesing |
| 6,832,650 B2 | 12/2004 | Nguyen et al. |
| 6,832,655 B2 | 12/2004 | Ravensbergen et al. |
| 6,837,309 B2 | 1/2005 | Boney et al. |
| 6,840,318 B2 | 1/2005 | Lee et al. |
| 6,851,474 B2 | 2/2005 | Nguyen |
| 6,852,173 B2 | 2/2005 | Banerjee et al. |
| 6,861,394 B2 | 3/2005 | Ballard et al. |
| 6,866,099 B2 | 3/2005 | Nguyen |
| 6,877,560 B2 | 4/2005 | Nguyen et al. |
| 6,881,709 B2 | 4/2005 | Nelson et al. |
| 6,887,834 B2 | 5/2005 | Nguyen et al. |
| 6,892,813 B2 | 5/2005 | Nguyen et al. |
| 6,949,491 B2 | 9/2005 | Cooke, Jr. |
| 6,962,200 B2 | 11/2005 | Nguyen et al. |
| 6,978,836 B2 | 12/2005 | Nguyen et al. |
| 6,981,560 B2 | 1/2006 | Nguyen et al. |
| 6,997,259 B2 | 2/2006 | Nguyen |
| 7,007,752 B2 | 3/2006 | Reddy et al. |
| 7,013,976 B2 | 3/2006 | Nguyen et al. |
| 7,017,665 B2 | 3/2006 | Nguyen |
| 7,021,379 B2 | 4/2006 | Nguyen et al. |
| 7,025,134 B2 | 4/2006 | Byrd et al. |
| 7,028,774 B2 | 4/2006 | Nguyen et al. |
| 7,032,667 B2 | 4/2006 | Nguyen et al. |
| 7,036,589 B2 | 5/2006 | Nguyen |
| 7,040,403 B2 | 5/2006 | Nguyen et al. |
| 7,044,220 B2 | 5/2006 | Nguyen et al. |
| 7,049,272 B2 | 5/2006 | Sinclair et al. |
| 7,059,406 B2 | 6/2006 | Nguyen |
| 7,063,150 B2 | 6/2006 | Slabaugh et al. |
| 7,066,258 B2 | 6/2006 | Justus et al. |
| 7,073,581 B2 | 7/2006 | Nguyen et al. |
| 7,080,688 B2 | 7/2006 | Todd et al. |
| 7,081,439 B2 | 7/2006 | Sullivan et al. |
| 7,093,658 B2 | 8/2006 | Chatterji et al. |
| 7,104,325 B2 | 9/2006 | Nguyen et al. |
| 7,114,560 B2 | 10/2006 | Nguyen et al. |
| 7,114,570 B2 | 10/2006 | Nguyen et al. |
| 7,117,942 B2 | 10/2006 | Dalrymple et al. |
| 7,131,491 B2 | 11/2006 | Blauch et al. |
| 7,153,575 B2 | 12/2006 | Anderson et al. |
| 7,156,194 B2 | 1/2007 | Nguyen |
| 7,166,560 B2 | 1/2007 | Still et al. |
| 7,178,596 B2 | 2/2007 | Blauch et al. |
| 7,204,311 B2 | 4/2007 | Welton et al. |
| 7,210,528 B1 | 5/2007 | Brannon et al. |
| 7,211,547 B2 | 5/2007 | Nguyen |
| 7,216,711 B2 | 5/2007 | Nguyen et al. |
| 7,237,609 B2 | 7/2007 | Nguyen |
| 7,252,146 B2 | 8/2007 | Slabaugh et al. |
| 7,255,169 B2 | 8/2007 | Van Batenburg et al. |
| 7,261,156 B2 | 8/2007 | Nguyen et al. |
| 7,264,051 B2 | 9/2007 | Nguyen et al. |
| 7,264,052 B2 | 9/2007 | Nguyen et al. |
| 7,265,079 B2 | 9/2007 | Willberg et al. |
| 7,267,171 B2 | 9/2007 | Dusterhoft et al. |
| 7,267,717 B2 | 9/2007 | Watanabe et al. |
| 7,273,099 B2 | 9/2007 | East, Jr. et al. |
| 7,281,580 B2 | 10/2007 | Nguyen et al. |
| 7,281,581 B2 | 10/2007 | Nguyen et al. |
| 7,299,875 B2 | 11/2007 | Nguyen et al. |
| 7,306,037 B2 | 12/2007 | Nguyen et al. |
| 7,343,973 B2 | 3/2008 | Dusterhoft et al. |
| 2001/0016562 A1 | 8/2001 | Muir et al. |
| 2002/0036088 A1 | 3/2002 | Todd |
| 2002/0043370 A1 | 4/2002 | Poe |
| 2002/0048676 A1 | 4/2002 | McDaniel et al. |
| 2002/0070020 A1 | 6/2002 | Nguyen |
| 2002/0104217 A1 | 8/2002 | Echols et al. |
| 2002/0160920 A1 | 10/2002 | Dawson et al. |
| 2002/0169085 A1 | 11/2002 | Miller et al. |
| 2002/0189808 A1 | 12/2002 | Nguyen et al. |
| 2003/0006036 A1 | 1/2003 | Malone et al. |
| 2003/0013871 A1 | 1/2003 | Mallon et al. |
| 2003/0060374 A1 | 3/2003 | Cooke, Jr. |
| 2003/0106690 A1 | 6/2003 | Boney et al. |
| 2003/0114314 A1 | 6/2003 | Ballard et al. |
| 2003/0114317 A1 | 6/2003 | Benton et al. |
| 2003/0130133 A1 | 7/2003 | Vollmer |
| 2003/0131999 A1 | 7/2003 | Nguyen et al. |
| 2003/0148893 A1 | 8/2003 | Lunghofer et al. |
| 2003/0186820 A1 | 10/2003 | Thesing |
| 2003/0188766 A1 | 10/2003 | Banerjee et al. |
| 2003/0188872 A1 | 10/2003 | Nguyen et al. |
| 2003/0196805 A1 | 10/2003 | Boney et al. |
| 2003/0205376 A1 | 11/2003 | Ayoub et al. |
| 2003/0230408 A1 | 12/2003 | Acock et al. |
| 2003/0230431 A1 | 12/2003 | Reddy et al. |
| 2003/0234103 A1 | 12/2003 | Lee et al. |
| 2004/0000402 A1 | 1/2004 | Nguyen et al. |
| 2004/0014607 A1 | 1/2004 | Sinclair et al. |
| 2004/0014608 A1 | 1/2004 | Nguyen et al. |
| 2004/0040706 A1 | 3/2004 | Hossaini et al. |
| 2004/0040708 A1 | 3/2004 | Stephenson et al. |
| 2004/0040712 A1 | 3/2004 | Ravi et al. |
| 2004/0040713 A1 | 3/2004 | Nguyen et al. |
| 2004/0043906 A1 | 3/2004 | Heath et al. |
| 2004/0045712 A1 | 3/2004 | Eoff et al. |
| 2004/0048752 A1 | 3/2004 | Nguyen et al. |
| 2004/0055747 A1 | 3/2004 | Lee |
| 2004/0060702 A1 | 4/2004 | Kotlar et al. |
| 2004/0106525 A1 | 6/2004 | Willberg et al. |
| 2004/0138068 A1 | 7/2004 | Rimmer et al. |
| 2004/0149441 A1 | 8/2004 | Nguyen et al. |
| 2004/0152601 A1 | 8/2004 | Still et al. |
| 2004/0152602 A1 | 8/2004 | Boles |
| 2004/0177961 A1 | 9/2004 | Nguyen et al. |
| 2004/0194961 A1 | 10/2004 | Nguyen et al. |
| 2004/0206499 A1 | 10/2004 | Nguyen et al. |
| 2004/0211559 A1 | 10/2004 | Nguyen et al. |
| 2004/0211561 A1 | 10/2004 | Nguyen et al. |
| 2004/0221992 A1 | 11/2004 | Nguyen et al. |
| 2004/0231845 A1 | 11/2004 | Cooke, Jr. |
| 2004/0231847 A1 | 11/2004 | Nguyen et al. |
| 2004/0256097 A1 | 12/2004 | Byrd et al. |
| 2004/0256099 A1 | 12/2004 | Nguyen et al. |
| 2004/0261993 A1 | 12/2004 | Nguyen |
| 2004/0261995 A1 | 12/2004 | Nguyen et al. |
| 2004/0261997 A1 | 12/2004 | Nguyen et al. |
| 2004/0261999 A1 | 12/2004 | Nguyen |
| 2005/0000694 A1 | 1/2005 | Dalrymple et al. |
| 2005/0000731 A1 | 1/2005 | Nguyen et al. |
| 2005/0006093 A1 | 1/2005 | Nguyen ............ 166/281 |
| 2005/0006095 A1 | 1/2005 | Justus et al. |
| 2005/0006096 A1 | 1/2005 | Nguyen et al. |
| 2005/0028976 A1 | 2/2005 | Nguyen |
| 2005/0028979 A1 | 2/2005 | Brannon et al. |

| | | | | | |
|---|---|---|---|---|---|
| 2005/0034862 A1 | 2/2005 | Nguyen | EP | 0643196 | 3/1995 |
| 2005/0034865 A1 | 2/2005 | Todd et al. | EP | 0834644 | 4/1998 |
| 2005/0045326 A1 | 3/2005 | Nguyen | EP | 0853186 | 7/1998 |
| 2005/0045330 A1 | 3/2005 | Nguyen et al. | EP | 0864726 | 9/1998 |
| 2005/0045384 A1 | 3/2005 | Nguyen | EP | 0879935 | 11/1998 |
| 2005/0051331 A1 | 3/2005 | Nguyen et al. | EP | 0933498 | 8/1999 |
| 2005/0051332 A1 | 3/2005 | Nguyen et al. | EP | 1001133 | 5/2000 |
| 2005/0059555 A1 | 3/2005 | Dusterhoft et al. | EP | 1132569 | 9/2001 |
| 2005/0061509 A1 | 3/2005 | Nguyen | EP | 1326003 | 7/2003 |
| 2005/0092489 A1 | 5/2005 | Welton et al. | EP | 1362978 | 11/2003 |
| 2005/0126780 A1 | 6/2005 | Todd et al. | EP | 1394355 | 3/2004 |
| 2005/0139359 A1 | 6/2005 | Maurer et al. | EP | 1396606 | 3/2004 |
| 2005/0145385 A1 | 7/2005 | Nguyen | EP | 1398460 | 3/2004 |
| 2005/0173116 A1 | 8/2005 | Nguyen et al. | EP | 1403466 | 3/2004 |
| 2005/0178551 A1 | 8/2005 | Tolman et al. | EP | 1464789 | 10/2004 |
| 2005/0194135 A1 | 9/2005 | Nguyen et al. ........... 166/272.1 | EP | 1607572 | 12/2005 |
| 2005/0194136 A1 | 9/2005 | Nguyen et al. | GB | 1107584 | 3/1968 |
| 2005/0194140 A1 | 9/2005 | Dalrymple et al. | GB | 1264180 | 2/1972 |
| 2005/0194142 A1 | 9/2005 | Nguyen | GB | 1292718 | 10/1972 |
| 2005/0197258 A1 | 9/2005 | Nguyen | GB | 2298440 | 9/1996 |
| 2005/0207001 A1 | 9/2005 | Laufer et al. | GB | 2382143 | 5/2003 |
| 2005/0257929 A1 | 11/2005 | Nguyen et al. | WO | WO 93/15127 | 8/1993 |
| 2005/0263283 A1 | 12/2005 | Nguyen | WO | WO 94/07949 | 4/1994 |
| 2005/0267001 A1 | 12/2005 | Weaver et al. | WO | WO 94/08078 | 4/1994 |
| 2005/0269086 A1 | 12/2005 | Nguyen et al. | WO | WO 94/08090 | 4/1994 |
| 2005/0269101 A1 | 12/2005 | Stegent et al. | WO | WO 95/09879 | 4/1995 |
| 2005/0274510 A1 | 12/2005 | Nguyen et al. | WO | WO 97/11845 | 4/1997 |
| 2005/0274517 A1 | 12/2005 | Blauch et al. | WO | WO 99/27229 | 6/1999 |
| 2005/0274520 A1 | 12/2005 | Nguyen et al. | WO | WO 01/87797 | 11/2001 |
| 2005/0277554 A1 | 12/2005 | Blauch et al. | WO | WO 0181914 | 11/2001 |
| 2005/0284632 A1 | 12/2005 | Dalrymple et al. | WO | WO 02/12674 | 2/2002 |
| 2005/0284637 A1 | 12/2005 | Stegent et al. | WO | WO 03/027431 | 4/2003 |
| 2006/0048943 A1 | 3/2006 | Parker et al. | WO | WO 2004/009956 | 1/2004 |
| 2006/0048944 A1 | 3/2006 | van Batenburg et al. | WO | WO 2004/037946 | 5/2004 |
| 2006/0052251 A1 | 3/2006 | Anderson et al. | WO | WO 2004/038176 | 5/2004 |
| 2006/0089266 A1 | 4/2006 | Dusterhoft et al. | WO | WO 2004/083600 | 9/2004 |
| 2006/0113078 A1 | 6/2006 | Nguyen et al. | WO | WO 2004090281 | 10/2004 |
| 2006/0124303 A1 | 6/2006 | Nguyen et al. | WO | WO 2004104368 | 12/2004 |
| 2006/0124309 A1 | 6/2006 | Nguyen et al. | WO | WO 2005/021928 | 3/2005 |
| 2006/0137875 A1 | 6/2006 | Dusterhoft et al. | WO | WO 2005080749 | 9/2005 |
| 2006/0157243 A1 | 7/2006 | Nguyen | WO | WO 2006/116868 A1 | 5/2006 |
| 2006/0175058 A1 | 8/2006 | Nguyen | WO | WO 2006103385 | 10/2006 |
| 2006/0219405 A1 | 10/2006 | Nguyen et al. | WO | WO 2007091007 | 8/2007 |
| 2006/0219408 A1 | 10/2006 | Nguyen et al. | WO | WO 2007091058 | 8/2007 |
| 2006/0234874 A1 | 10/2006 | Eoff et al. | | | |
| 2006/0240994 A1 | 10/2006 | Eoff et al. | | | |
| 2006/0240995 A1 | 10/2006 | Rickman et al. | | | |

OTHER PUBLICATIONS

Search Report and Written Opinion for International Patent Application No. PCT/GB2007/000421 mailed on May 10, 2007 and filed on Feb. 7, 2007.

Notice of Publication dated Dec. 20, 2007 from U.S. Appl. No. 11/880,230.

Office Action dated Mar. 19, 2008 from U.S. Appl. No. 11/482,601.

Notice of Publication dated Jun. 12, 2008 from U.S. Appl. No. 12/070,301.

U.S. Appl. No. 12/080,647, filed Apr. 4, 2008, Dalrymple et al.

"Santrol Bioballs"; http://www.fairmounminerals.com/.sub.—SANTROL/SANTROL%20Web%20Site/B.sub-.—TD.htm. cited by other, Sep. 30, 2004.

CDX Gas, "What is Coalbed Methane?" CDX, LLC. Available @ www.cdxgas.com/what.html, printed p. 1, undated. cited by other, Feb. 16, 2005.

CDX Gas, CDX Solution, 2003, CDX, LLC, Available @ www.cdxgas.com/solution.html, printed pp. 1-2, Feb. 16, 2005.

Dusseault, et al., "Pressure Pulse Workovers in Heavy Oil," SPE 79033, Nov. 2002.

Feisenthal, et al., "Pressure Pulsing—An Improved Method of Waterflooding Fractured Reservoirs," SPE 1788, 1967.

International Search Report and Opinion (PCT/GB2004/002412), Sep. 16, 2004.

International Search Report and Opinion (PCT/GB2005/003845), Jul. 31, 2006.

| | | | |
|---|---|---|---|
| 2006/0260810 A1* | 11/2006 | Weaver et al. ............... 166/278 | |
| 2006/0260813 A1 | 11/2006 | Welton et al. | |
| 2006/0264332 A1* | 11/2006 | Welton et al. ............... 507/203 | |
| 2006/0266522 A1 | 11/2006 | Eoff et al. | |
| 2006/0283592 A1 | 12/2006 | Sierra et al. | |
| 2006/0289160 A1 | 12/2006 | van Batenburg et al. | |
| 2007/0007010 A1 | 1/2007 | Welton et al. | |
| 2007/0012445 A1 | 1/2007 | Nguyen et al. | |
| 2007/0029087 A1 | 2/2007 | Nguyen et al. | |
| 2007/0114032 A1 | 5/2007 | Stegent et al. | |
| 2007/0131422 A1 | 6/2007 | Gatlin et al. | |
| 2007/0131425 A1 | 6/2007 | Gatlin et al. | |
| 2007/0187097 A1 | 8/2007 | Weaver et al. | |
| 2007/0215354 A1 | 9/2007 | Rickman et al. | |
| 2007/0267194 A1 | 11/2007 | Nguyen et al. | |
| 2008/0006405 A1 | 1/2008 | Rickman et al. | |
| 2008/0006406 A1 | 1/2008 | Nguyen et al. | |
| 2008/0110624 A1 | 5/2008 | Nguyen et al. | |
| 2009/0151943 A1 | 6/2009 | Nguyen | |

FOREIGN PATENT DOCUMENTS

| | | |
|---|---|---|
| EP | 0313243 | 4/1989 |
| EP | 0506934 | 10/1992 |
| EP | 0510762 | 11/1992 |
| EP | 0528595 | 2/1993 |

International Search Report and Opinion (PCT/GB2005/004009), Jan. 11, 2006.
International Search Report (CPW 21582 EP), Mar. 11, 2005.
International Search Report and Opinion (PCT/GB2004/001497), Jul. 20, 2004.
International Search Report and Opinion (PCT/GB2004/001842), Dec. 10, 2004.
International Search Report and Opinion (PCT/GB2004/002674), Dec. 16, 2004.
International Search Report and Opinion (PCT/GB2004/002968), Nov. 16, 2004.
International Search Report and Opinion (PCT/GB2004/004242), Feb. 10, 2005.
International Search Report and Opinion (PCT/GB2004-000689), Jun. 4, 2004.
International Search Report and Opinion (PCT/GB2004/002727), Mar. 11, 2005.
International Search Report and Opinion (PCT/GB2004/002747), Mar. 11, 2005.
International Search Report and Opinion (PCT/GB2005/004010), Mar. 21, 2006.
International Search Report and Opinion (PCT/GB2006/004102), Feb. 20, 2007.
International Search Report and Opinion (PCT/GB2006/004137), Jun. 5, 2008.
International Search Report and Opinion (PCT/GB2006/004852), Mar. 7, 2007.
International Search Report and Opinion (PCT/GB2007/000467), Jun. 15, 2007.
International Search Report and Opinion (PCT/GB2006/000366), Jun. 22, 2006.
International Search Report and Opinion (PCT/GB2005/003747), Dec. 12, 2005.
Gidley, et al., "Recent Advances in Hydraulic Fracturing," Chapter 6, pp. 109-130, 1989.
Gorman, "Plastic Electric: Lining up the Future of Conducting Polymers Science News," vol. 163, May 17, 2003.
Halliburton brochure entitled "H2Zero Service: Introducing The Next Generation of Cost-Effective Conformance Control Solutions," 2002. cited by other, 2002.
Halliburton brochure entitled "CobraFrac Service, Cost-Effective Method for Stimulation Untapped Reserves—Proved in More Than 30,000 Fracture Treatments", 2004.
Halliburton brochure entitled "CobraJetFrac Service, Cost-Effective Technology That Can Help Reduce Cost per BOE Produced, Shorten Cycle time and Reduce Capex".
Halliburton brochure entitled "SurgiFrac Service, a Quick and Cost-Effective Method to Help Boost Production From Openhole Horizontal Completions", 2002.
Halliburton brochure entitled "Sanfix A Resin", 1999.
Halliburton brochure entitled "INJECTROL A Component", 1999.
Halliburton brochure entitled "INJECTOL U Sealant", 1999.
Halliburton brochure entitled "INJECTROL G Sealant", 1999.
Halliburton brochure entitled "INJECTROL IT Sealant", 1999.
Halliburton brochure entitled "INJECTROL Service Treatment", 1999.
Halliburton brochure entitled "Pillar Frac Stimulation Technique," Fracturing Service Technical Data Sheet.
Halliburton Cobra Frac Advertisement, 2001.
Halliburton Technical Flier—"Multi Stage Frac Completion Methods".
Halliburton brochure entitled "CoalStim Service, Helps Boost Cash Flow From CBM Assets", 2003.
Halliburton brochure entitled "Conductivity Endurance Technology for High Permeability Reservoirs, Helps Prevent Intrusion of Formation Material Into the Proppant Pack for Improved Long-term Production", 2003.
Halliburton brochure entitled "Expedite Service, A Step-Change Improvement Over Conventional Proppant Flowback Control Systems. Provides Up to Three Times the Conductivity of RCPs", May 2004.

Halliburton brochure entitled "SandWedge® NT Conductivity Enhancement System, Enhances Proppant Pack Conductivity and Helps Prevent Intrusion of Formation Material for Improved Long-Term Production", 2004.
International Search Report and Opinion (PCT/GB007/002273), Sep. 3, 2007.
International Search Report and Opinion (PCT/GB2004/002948), May 24, 2005.
International Search Report and Opinion (PCT/GB2005/000637), Jun. 2, 2005.
International Search Report and Opinion (PCT/GB2005/000634), Jun. 8, 2005.
International Preliminary Report on Patentability (PCT/GB2005/000634), Sep. 14, 2006.
Kazakov, et al., "Optimizing and Managing Coiled Tubing Frac Strings," SPE 60747, Apr. 2000.
Nguyen, et al., AA Novel Approach For Enhancing Proppant Consolidation: Laboratory Testing And Field Applications, SPE 77748, 2002.
Nguyen, et al., "New Guidelines for Applying Curable Resin-Coated Proppants," SPE 39582, 1997.
Owens, et al., "Waterflood Pressure Pulsing for Fractured Reservoirs," SPE 1123, Jun. 1966.
Peng, et al., "Pressure Pulsing Waterflooding in Dual Porosity Naturally Fractured Reservoirs," SPE 17587, Nov. 1988.
Raza, "Water and Gas Cyclic Pulsing Method for Improved Oil Recovery," SPE 3005, Dec. 1971.
Almond, et al., "Factors Affecting Proppant Flowback With Resin Coated Proppants," SPE 30096, May 1995.
Wagner, et al., "Field Application of Lignosulfonate Gels To Reduce Channeling, South Swan Hills Miscible Unit, Alberta, Canada," SPE 15547, Oct. 1986.
Paccaloni, et al., "Key Factors for Enhanced Results of Matrix Stimulation Treatments," SPE 17154, Feb. 1988.
Paccaloni, et al., "Advances in Matrix Stimulation Technology," SPE 20623, Mar. 1993.
Nguyen, et al., "Controlling Proppant Flowback in High-Temperature, High-Production Wells," SPE 82215, May 2003.
Dusterhoft, et al., "Maximizing Effective Proppant Permeability under High-Stress, High Gas-Rate Conditions," SPE 90398, Sep. 2004.
Yang, et al., "Experimental Study on Fracture Initiation by Pressure Pulse," SPE 63035, Oct. 2000.
Office Action mailed Sep. 8, 2008 for U.S. Appl. No. 12/070,301.
Office Action mailed Sep. 2, 2008 for U.S. Appl. No. 11/482,601.
Office Action for U.S. Appl. No. 11/880,230, mailed Jan. 22, 2009.
U.S. Appl. No. 10/603,492, filed Jun. 25, 2003, Nguyen, et al.
U.S. Appl. No. 10/649,029, filed Aug. 27, 2003, Nguyen et al.
U.S. Appl. No. 10/727,365, filed Dec. 4, 2003, Reddy et al.
U.S. Appl. No. 10/853,879, filed May 26, 2004, Nguyen et al.
U.S. Appl. No. 10/861,829, filed Jun. 4, 2004, Stegent et al.
U.S. Appl. No. 10/868,593, filed Jun. 15, 2004, Nguyen et al.
U.S. Appl. No. 10/937,076, filed Sep. 9, 1994, Nguyen et al.
U.S. Appl. No. 10/944,973, filed Sep. 20, 2004, Nguyen et al.
U.S. Appl. No. 11/011,394, filed Dec. 12, 2004, Nguyen et al.
U.S. Appl. No. 11/035,833, filed Jan. 14, 2005, Nguyen et al.
U.S. Appl. No. 11/049,252, filed Feb. 2, 2005, Van Batenburg et al.
U.S. Appl. No. 11/053,280, filed Feb. 8, 2005, Nguyen.
U.S. Appl. No. 11/056,635, filed Feb. 11, 2005, Dusterhoft et al.
Halliburton "CobraFrac$^{SM}$ Service, Coiled Tubing Fracturing—Cost-Effective Method for Stimulating Untapped Reserves," 2 pages, 2004.
"Degradable Aliphatic Polyesters," Advances in Polymer Science, vol. 157, edited by A.C. Albertson, pp. 1-138, 2001.
Simmons, et al., "Poly(phenyllactide): Synthesis, Characterization, and Hydrolytic Degradation," Biomacromolecules, vol. 2, No. 2, pp. 658-663, 2001.
Yin, et al., "Preparation and Characterization of Substituted Polylactides," American Chemical Society, vol. 32, No. 223, pp. 7711-7718, 1999.
Yin, et al., "Synthesis and Properties of Polymers Derived From Substituted Lactic Acids," American Chemical Society, Ch. 12, pp. 147-159, 2001.

Cantu, et al., "Laboratory and Field Evaluation of a Combined Fluid-Loss Control Additive and Gel Breaker for Fracturing Fluids," SPE 18211, 1990.

Love, et al., "Selectively Placing Many Fractures in Openhole Horizontal Wells Improves Production," SPE 50422, 1998.

McDaniel, et al., "Evolving New Stimulation Process Proves Highly Effective in Level 1 Dual-Lateral Completion," SPE 78697, 2002.

Dechy-Cabaret, et al., "Controlled Ring-Operated Polymerization of Lactide and Glycolide," American Chemical Society, Chemical Reviews, A-Z, AA-AD, 2004.

Funkhouser, et al., "Synthetic Polymer Fracturing Fluid for High-Temperature Applications," SPE 80236, 2003.

"Chelating Agents," Encyclopedia of Chemical Technology, vol. 5 (764-795), 2001.

Vichaibun, et al., "A New Assay for the Enzymatic Degradation of Polylactic Acid, Short Report," ScienceAsia, vol. 29, pp. 297-300, 2003.

Office Action mailed Mar. 11, 2009 for U.S. Appl. No. 12/070,301, 2009.

Office Action mailed Apr. 10, 2007 for U.S. Appl. No. 11/482,601, 2007.

Office Action mailed Sep. 21, 2007 for U.S. Appl. No. 11/482,601, 2007.

U.S. Appl. No. 11/482,601 by Richard D. Rickman, et al. entitled "Methods and Compositions for Enhancing Proppant Pack Conductivity and Strength", Jul. 6, 2006.

U.S. Appl. No. 11/880,230 by Richard D. Rickman entitled "Consolidating Agent Emulsions and Associated Methods", Aug. 30, 2007.

U.S. Appl. No. 12/070,301 by Philip D. Nguyen, et al. entitled "Compositions and Applications of Resins in Treating Subterranean Formations", Feb. 15, 2008.

U.S. Appl. No. 12/319,370 by Philip D. Nguyen, et al. entitled "Aqueous-Based Emulsified Consolidating Agents Suitable for Use in Drill-In Applications", Jan. 12, 2009.

Office Action for U.S. Appl. No. 12/070,301, dated Jul. 20, 2009.

Examination Report for European Patent Application No. 07705152.2, dated Jul. 2, 2009.

Office Action for U.S. Appl. No. 11/880,230 dated Aug. 3, 2009.

Office Action for U.S. Appl. No. 12/070,301 dated Jun. 29, 2010.

* cited by examiner

CONSOLIDATING AGENT EMULSIONS AND ASSOCIATED METHODS

BACKGROUND

The present invention relates to methods and compositions useful in treating subterranean formations, and more particularly, to consolidating relatively unconsolidated portions of subterranean formations and minimizing the flow back of unconsolidated particulate material (referred to collectively herein as "particulate migration"). This invention also relates to modifying the stress-activated reactivity of subterranean fracture faces and other surfaces in subterranean formations.

In the production of hydrocarbons from a subterranean formation, the subterranean formation preferably should be sufficiently conductive to permit desirable fluids, such as oil and gas, to flow to a well bore that penetrates the formation. One type of treatment that may be used to increase the conductivity of a subterranean formation is hydraulic fracturing. Hydraulic fracturing operations generally involve pumping a treatment fluid (e.g., a fracturing fluid or a "pad" fluid) into a well bore that penetrates a subterranean formation at a sufficient hydraulic pressure to create or enhance one or more fractures in the subterranean formation. The fluid used in the treatment may comprise particulates, often referred to as "proppant particulates," that are deposited in the resultant fractures. These proppant particulates are thought to prevent the fractures from fully closing upon the release of hydraulic pressure, forming conductive channels through which fluids may flow to a well bore. The term "propped fracture" as used herein refers to a fracture (naturally-occurring or otherwise) in a portion of a subterranean formation that contains at least a plurality of proppant particulates. The term "proppant pack" refers to a collection of proppant particulates within a fracture.

A type of particulate migration that may affect fluid conductivity in the formation is the flow back of unconsolidated particulate material (e.g., formation fines, proppant particulates, etc.) through the conductive channels in the subterranean formation, which can, for example, clog the conductive channels and/or damage the interior of the formation or equipment. There are several known techniques used to control particulate migration, some of which may involve the use of consolidating agents. The term "consolidating agent" as used herein includes any compound that is capable of minimizing particulate migration in a subterranean formation and/or modifying the stress-activated reactivity of subterranean fracture faces and other surfaces in subterranean formations.

One well-known technique used to control particulate migration in subterranean formations is commonly referred to as "gravel packing," which involves the placement of a filtration bed of gravel particulates in the subterranean formation, which acts as a barrier to prevent particulates from flowing into the well bore. These gravel packing operations may involve the use of consolidating agents to bind the gravel particulates together in order to form a porous matrix through which formation fluids can pass.

Another technique that may be used to control particulate migration involves coating proppant particulates with a consolidating agent to facilitate their consolidation within the formation and to prevent their subsequent flow-back through the conductive channels in the subterranean formation.

Another method used to control particulate migration involves consolidating unconsolidated portions of subterranean zones into relatively stable permeable masses by applying a consolidating agent to an unconsolidated portion of the subterranean formation. One example of this method is applying a curable resin to a portion of the zone, followed by a spacer fluid and then a catalyst. Another example of this method involves applying a tackifying composition (aqueous or non-aqueous) to a portion of the formation in an effort to reduce the migration of particulates therein. Whereas a curable resin composition produces a hard mass, the use of a tackifying composition produces a more malleable consolidated mass.

Although consolidating agents are used frequently, they may be difficult to handle, transport and clean-up due to their inherent tendency to stick to equipment or anything else with which they may come into contact. Therefore, it would be desirable to provide compositions and methods that would, among other things, help ease the handling, transport and clean up when using consolidating agents.

One additional problem that can negatively impact conductivity and further complicate the effects of particulate migration is the tendency of mineral surfaces in a subterranean formation to undergo chemical reactions caused, at least in part, by conditions created by mechanical stresses on those minerals (e.g., fracturing of mineral surfaces, compaction of mineral particulates). These reactions are herein referred to as "stress-activated reactions" or "stress-activated reactivity." As used herein, the term "mineral surface in a subterranean formation" and derivatives thereof refer to any surface in a subterranean formation comprised of minerals and/or the surface of a particulate. These minerals may comprise any mineral found in subterranean formations, including silicate minerals (e.g., quartz, feldspars, clay minerals), carbonaceous minerals, metal oxide minerals, and the like. The mineral surface in a subterranean formation treated in the methods of the present invention may have been formed at any time. The term "modifying the stress-activated reactivity of a mineral surface" and its derivatives as used herein refers to increasing or decreasing the tendency of a mineral surface in a subterranean formation to undergo one or more stress-activated reactions, or attaching a compound to the mineral surface that is capable of participating in one or more subsequent reactions with a second compound.

One type of reaction caused, at least in part, by conditions created by mechanical stresses on minerals is a diageneous reaction. As used herein, the terms "diageneous reaction," "diageneous reactivity," and "diagenesis" are defined to include chemical and physical processes that move a portion of a mineral sediment and/or convert the mineral sediment into some other mineral form in the presence of water. A mineral sediment that has been so moved or converted is herein referred to as a "diageneous product." Any mineral sediment may be susceptible to these diageneous reactions, including silicate minerals (e.g., quartz, feldspars, clay minerals), carbonaceous minerals, metal oxide minerals, and the like.

Two of the principle mechanisms that diageneous reactions are thought to involve are pressure solution and precipitation processes. Where two water-wetted mineral surfaces are in contact with each other at a point under strain, the localized mineral solubility near that point is thought to increase, causing the minerals to dissolve. Minerals in solution may diffuse through the water film outside of the region where the mineral surfaces are in contact (e.g., in the pore spaces of a proppant pack), where they may precipitate out of solution. The dissolution and precipitation of minerals in the course of these reactions may reduce the conductivity of the formations by, among other things, clogging the conductive channels in the formation with mineral precipitate and/or collapsing those conductive channels by dissolving solid minerals in the surfaces of those channels.

Moreover, in the course of a fracturing treatment, new mineral surfaces may be created in the "walls" surrounding the open space of the fracture. These new walls created in the course of a fracturing treatment are herein referred to as "fracture faces." Such fracture faces may exhibit different types and levels of reactivity, for example, stress-activated reactivity. In some instances, fracture faces may exhibit an increased tendency to undergo diageneous reactions. In other instances, fracture faces also may exhibit an increased tendency to react with substances in formation fluids and/or treatment fluids that are in contact with those fracture faces, such as water, polymers (e.g., polysaccharides, biopolymers, etc.), and other substances commonly found in these fluids, whose molecules may become anchored to the fracture face. This reactivity may further decrease the conductivity of the formation through, inter alia, increased diageneous reactions and/or the obstruction of conductive fractures in the formation by any molecules that have become anchored to the fracture faces.

Therefore, what is desirable is a means for minimizing particulate migration and diagenesis reactions within a subterranean formation that would allow for efficient and relatively easy handling, transportation and clean up.

SUMMARY

The present invention relates to methods and compositions useful for minimizing particulate migration. This invention also relates to modifying the stress-activated reactivity of subterranean fracture faces and other surfaces in subterranean formations.

In some embodiments, the present invention provides a method comprising the steps of: providing a consolidating agent emulsion composition that comprises an aqueous fluid, a surfactant, and a consolidating agent; and coating at least a plurality of particulates with the consolidating agent emulsion to produce a plurality of consolidating agent emulsion coated particulates.

In other embodiments, the present invention provides a method comprising the steps of: providing a treatment fluid comprising a consolidating agent emulsion comprising an aqueous fluid, an amine surfactant, and a consolidating agent; and introducing the treatment fluid into a subterranean formation.

In other embodiments, the present invention provides a method comprising the steps of: coating a plurality of particulates with a consolidating agent emulsion to produce consolidating agent emulsion coated particulates; providing a treatment fluid comprising an aqueous fluid, a surfactant, and a consolidating agent; introducing the treatment fluid into a subterranean formation.

In other embodiments, the present invention provides a consolidating agent emulsion composition comprising: an aqueous fluid; a surfactant; and a consolidating agent comprising a non-aqueous tackifying agent or resin.

The features and advantages of the present invention will be readily apparent to those skilled in the art. While numerous changes may be made by those skilled in the art, such changes are within the spirit of the invention.

BRIEF DESCRIPTION OF THE DRAWINGS

These drawings illustrate certain aspects of some of the embodiments of the present invention, and should not be used to limit or define the invention.

DESCRIPTION OF PREFERRED EMBODIMENTS

Figure 1:
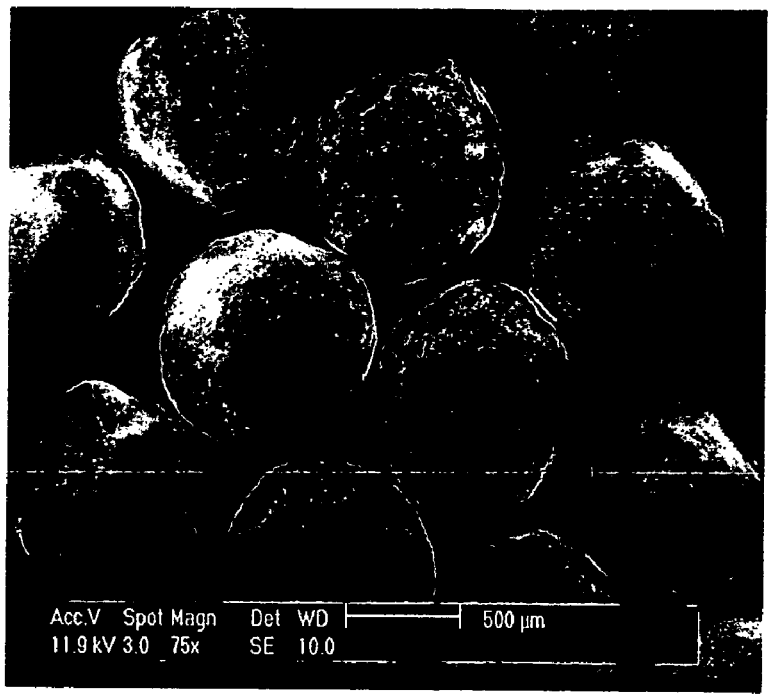
FIG. 1 is a microscopy image of untreated proppant particulates.

The present invention relates to methods and compositions useful for minimizing particulate migration. This invention also relates to modifying the stress-activated reactivity of subterranean fracture faces and other surfaces in subterranean formations. One of the many advantages of the consolidating agent emulsions of the present invention is that they may enhance the efficiency and ease of using consolidating agents by allowing for, inter alia, relatively easy clean up of equipment and reduced potential damage to equipment due to the buildup of the consolidation agent on the equipment. In some embodiments, the consolidating agent emulsions of the present invention may also eliminate the need for an expensive and/or flammable solvent that might otherwise be necessary when using consolidating agents and may thereby reduce possible undesirable environmental concerns related to the use and disposal of such solvents.

A. The Consolidating Agent Emulsions of the Present Invention

The consolidating agent emulsions of the present invention comprise an aqueous fluid, a surfactant, and a consolidating agent. These consolidating agent emulsions have water external phases and oil internal phases.

1. Suitable Aqueous Fluids

Suitable aqueous fluids that may be used in the consolidating agent emulsions of the present invention include fresh water, salt water, brine, seawater, or any other aqueous fluid that, preferably, does not adversely react with the other components used in accordance with this invention or with the subterranean formation. One should note, however, that if long-term stability of the emulsion is desired, the preferred aqueous fluid is one that is substantially free of salts. It is within the ability of one skilled in the art with the benefit of this disclosure to determine if and how much salt may be tolerated in the consolidating agent emulsions of the present invention before it becomes problematic for the stability of the emulsion. The aqueous fluid preferably is present in the consolidating agent emulsions of the present invention in an amount in the range from about 40% to 80% by weight of the consolidating agent emulsion composition.

2. Suitable Types of Consolidating Agents

The consolidating agents used in the compositions and methods of the present invention generally comprise any compound that is capable of minimizing particulate migration and/or modifying the stress-activated reactivity of subterranean fracture faces and other surfaces in subterranean formations. The consolidating agent may comprise compounds such as non-aqueous tackifying agents or resins. The consolidating agents may be present in the consolidating agent emulsions of the present invention in an amount in the range from about 5% to 95% by weight of the composition. Preferably, the consolidating agent is present in the consolidating agent emulsions of the present invention in an amount in the range from about 15% to 50% by weight of the composition. The type and amount of consolidating agent included in a particular composition or method of the invention may depend upon, among other factors, the temperature of the subterranean formation, the chemical composition of formations fluids, flow rate of fluids present in the formation, and the like. It is within the ability of one skilled in the art, with the benefit of this disclosure, to determine the type and amount of consolidating agent to include in the consolidating agent emulsions of the present invention to achieve the desired results.

a. Non-Aqueous Tackifying Agents

In some embodiments of the present invention, the consolidating agent may comprise a non-aqueous tackifying agent. A particularly preferred group of non-aqueous tackifying agents comprises polyamides that are liquids or in solution at the temperature of the subterranean formation such that they are, by themselves, non-hardening when introduced into the subterranean formation. A particularly preferred product is a condensation reaction product comprised of commercially available polyacids and a polyamine. Such commercial products include compounds such as mixtures of $C_{36}$ dibasic acids containing some trimer and higher oligomers and also small amounts of monomer acids that are reacted with polyamines. Other polyacids include trimer acids, synthetic acids produced from fatty acids, maleic anhydride, acrylic acid, and the like. Such acid compounds are commercially available from companies such as Witco Corporation, Union Camp, Chemtall, and Emery Industries. The reaction products are available from, for example, Champion Technologies, Inc. and Witco Corporation.

Additional compounds which may be used as non-aqueous tackifying agents include liquids and solutions of, for example, polyesters, polycarbonates and polycarbamates, natural resins such as shellac and the like.

Other suitable non-aqueous tackifying agents are described in U.S. Pat. No. 5,853,048 issued to Weaver, et al. and U.S. Pat. No. 5,833,000 issued to Weaver, et al., the relevant disclosures of which are herein incorporated by reference.

Non-aqueous tackifying agents suitable for use in the present invention may either be used such that they form a non-hardening coating or they may be combined with a multifunctional material capable of reacting with the non-aqueous tackifying agent to form a hardened coating. A "hardened coating" as used herein means that the reaction of the tackifying compound with the multifunctional material will result in a substantially non-flowable reaction product that exhibits a higher compressive strength in a consolidated agglomerate than the tackifying compound alone with the particulates. In this instance, the non-aqueous tackifying agent may function similarly to a hardenable resin.

Multifunctional materials suitable for use in the present invention include, but are not limited to, aldehydes, dialdehydes such as glutaraldehyde, hemiacetals or aldehyde releasing compounds, diacid halides, dihalides such as dichlorides and dibromides, polyacid anhydrides such as citric acid, epoxides, furfuraldehyde, glutaraldehyde, aldehyde condensates, and silyl-modified polyamide compounds and the like, and combinations thereof. Suitable silyl-modified polyamide compounds that may be used in the present invention are those that are substantially self-hardening compositions capable of at least partially adhering to particulates in the unhardened state, and that are further capable of self-hardening themselves to a substantially non-tacky state to which individual particulates such as formation fines will not adhere to, for example, in formation or proppant pack pore throats. Such silyl-modified polyamides may be based, for example, on the reaction product of a silating compound with a polyamide or a mixture of polyamides. The polyamide or mixture of polyamides may be one or more polyamide intermediate compounds obtained, for example, from the reaction of a polyacid (e.g., diacid or higher) with a polyamine (e.g., diamine or higher) to form a polyamide polymer with the elimination of water.

In some embodiments of the present invention, the multifunctional material may be mixed with the tackifying compound in an amount of from about 0.01% to about 50% by weight of the tackifying compound to effect formation of the reaction product. In other embodiments, the compound is present in an amount of from about 0.5% to about 1% by weight of the tackifying compound. Suitable multifunctional materials are described in U.S. Pat. No. 5,839,510 issued to Weaver, et al., the relevant disclosure of which is herein incorporated by reference.

b. Resins

In some embodiments of the present invention, the consolidating agent may comprise a resin. The term "resin" as used herein refers to any of numerous physically similar polymerized synthetics or chemically modified natural resins including thermoplastic materials and thermosetting materials. Resins suitable for use in the present invention include all resins known and used in the art. One type of resin coating material suitable for use in the compositions and methods of the present invention is a two-component epoxy based resin comprising a liquid hardenable resin component and a liquid hardening agent component. The liquid hardenable resin component is comprised of a hardenable resin and an optional solvent. The solvent may be added to the resin to reduce its viscosity for ease of handling, mixing and transferring. It is within the ability of one skilled in the art with the benefit of this disclosure to determine if and how much solvent may be needed to achieve a viscosity suitable to the subterranean conditions. Factors that may affect this decision include geographic location of the well, the surrounding weather conditions, and the desired long-term stability of the consolidating agent emulsion. An alternate way to reduce the viscosity of the hardenable resin is to heat it. This method avoids the use of a solvent altogether, which may be desirable in certain circumstances. The second component is the liquid hardening agent component, which is comprised of a hardening agent, a silane coupling agent, a surfactant, an optional hydrolyzable ester for, among other things, breaking gelled fracturing fluid films on the proppant particulates, and an optional liquid carrier fluid for, among other things, reducing the viscosity of the hardening agent component.

Examples of hardenable resins that can be used in the liquid hardenable resin component include, but are not limited to, organic resins such as bisphenol A diglycidyl ether resin, butoxymethyl butyl glycidyl ether resin, bisphenol A-epichlorohydrin resin, bisphenol F resin, polyepoxide resin, novolak resin, polyester resin, phenol-aldehyde resin, ureaaldehyde resin, furan resin, urethane resin, a glycidyl ether resin, other similar epoxide resins and combinations thereof. The hardenable resin used is included in the liquid hardenable resin component in an amount in the range of from about 5% to about 100% by weight of the liquid hardenable resin component. In some embodiments the hardenable resin used is included in the liquid hardenable resin component in an amount of about 25% to about 55% by weight of the liquid hardenable resin component. It is within the ability of one skilled in the art with the benefit of this disclosure to determine how much of the liquid hardenable resin component may be needed to achieve the desired results. Factors that may affect this decision include which type of liquid hardenable resin component and liquid hardening agent component are used.

Any solvent that is compatible with the hardenable resin and achieves the desired viscosity effect may be suitable for use in the liquid hardenable resin component. Suitable solvents may include butyl lactate, dipropylene glycol methyl ether, dipropylene glycol dimethyl ether, dimethyl formamide, diethyleneglycol methyl ether, ethyleneglycol butyl ether, diethyleneglycol butyl ether, propylene carbonate, methanol, butyl alcohol, d'limonene, fatty acid methyl esters, and combinations thereof. Other preferred solvents may include aqueous dissolvable solvents such as, methanol, isopropanol, butanol, glycol ether solvents, and combinations thereof. Suitable glycol ether solvents include, but are not limited to, diethylene glycol methyl ether, dipropylene glycol methyl ether, 2-butoxy ethanol, ethers of a $C_2$ to $C_6$ dihydric alkanol containing at least one $C_1$ to $C_6$ alkyl group, mono ethers of dihydric alkanols, methoxypropanol, butoxyethanol, hexoxyethanol, and isomers thereof. Selection of an appropriate solvent is dependent on the resin composition chosen and is within the ability of one skilled in the art with the benefit of this disclosure.

As described above, use of a solvent in the liquid hardenable resin component is optional but may be desirable to reduce the viscosity of the hardenable resin component for ease of handling, mixing, and transferring. It is within the ability of one skilled in the art, with the benefit of this disclosure, to determine if and how much solvent is needed to achieve a suitable viscosity. In some embodiments, the amount of the solvent used in the liquid hardenable resin component may be in the range of from about 0.1% to about 30% by weight of the liquid hardenable resin component. Optionally, the liquid hardenable resin component may be heated to reduce its viscosity, in place of, or in addition to, using a solvent.

Examples of the hardening agents that can be used in the liquid hardening agent component include, but are not limited to, piperazine, derivatives of piperazine (e.g., aminoethylpiperazine), 2H-pyrrole, pyrrole, imidazole, pyrazole, pyridine, pyrazine, pyrimidine, pyridazine, indolizine, isoindole, 3H-indole, indole, 1H-indazole, purine, 4H-quinolizine, quinoline, isoquinoline, phthalazine, naphthyridine, quinoxaline, quinazoline, 4H-carbazole, carbazole, β-carboline, phenanthridine, acridine, phenathroline, phenazine, imidazolidine, phenoxazine, cinnoline, pyrrolidine, pyrroline, imidazoline, piperidine, indoline, isoindoline, quinuclindine, morpholine, azocine, azepine, 2H-azepine, 1,3,5-triazine, thiazole, pteridine, dihydroquinoline, hexa methylene imine, indazole, amines, aromatic amines, polyamines, aliphatic amines, cyclo-aliphatic amines, amides, polyamides, 2-ethyl-4-methyl imidazole, 1,1,3-trichlorotrifluoroacetone, and combinations thereof. The chosen hardening agent often effects the range of temperatures over which a hardenable resin is able to cure. By way of example and not of limitation, in subterranean formations having a temperature from about 60° F. to about 250° F., amines and cyclo-aliphatic amines such as piperidine, triethylamine, N,N-dimethylaminopyridine, benzyldimethylamine, tris(dimethylaminomethyl)phenol, and 2-($N_2$N-dimethylaminomethyl)phenol are preferred with N,N-dimethylaminopyridine most preferred. In subterranean formations having higher temperatures, 4,4'-diaminodiphenyl sulfone may be a suitable hardening agent. Hardening agents that comprise piperazine or a derivative of piperazine have been shown capable of curing various hardenable resins from temperatures as low as about 70° F. to as high as about 350° F. The hardening agent used may be included in the liquid hardening agent component in an amount sufficient to consolidate the coated particulates. In some embodiments of the present invention, the hardening agent used is included in the liquid hardening agent component in the range of from about 5% to about 95% by weight of the liquid hardening agent component. In other embodiments, the hardening agent used may be included in the liquid hardening agent component in an amount of about 15% to about 85% by weight of the liquid hardening agent component. In other embodiments, the hardening agent used may be included in the liquid hardening agent component in an amount of about 15% to about 55% by weight of the liquid hardening agent component.

The silane coupling agent may be used, among other things, to act as a mediator to help bond the resin to formation particulates and-or proppant. Examples of suitable silane coupling agents include, but are not limited to, N-β-(aminoethyl)-γ-aminopropyl trimethoxysilane, N-2-(aminoethyl)-3-aminopropyltrimethoxysilane, 3-glycidoxypropyltrimethoxysilane, and combinations thereof. The silane coupling agent used is included in the liquid hardening agent component in an amount capable of sufficiently bonding the resin to the particulate. In some embodiments of the present invention, the silane coupling agent used is included in the liquid hardening agent component in the range of from about 0.1% to about 3% by weight of the liquid hardening agent component.

Any surfactant compatible with the hardening agent and capable of facilitating the coating of the resin onto particulates in the subterranean formation may be used in the liquid hardening agent component. Such surfactants include, but are not limited to, an alkyl phosphonate surfactant (e.g., a $C_{12}$-$C_{22}$ alkyl phosphonate surfactant), an ethoxylated nonyl phenol phosphate ester, one or more cationic surfactants, and one or more nonionic surfactants. Mixtures of one or more cationic and nonionic surfactants also may be suitable. Examples of such surfactant mixtures are described in U.S. Pat. No. 6,311,773 issued to Todd et al. on Nov. 6, 2001, the relevant disclosure of which is incorporated herein by reference. The surfactant or surfactants that may be used are included in the liquid hardening agent component in an amount in the range of from about 1% to about 10% by weight of the hardening agent component.

While not required, examples of hydrolyzable esters that may be used in the liquid hardening agent component include, but are not limited to, a mixture of dimethylglutarate, dimethyladipate, and dimethylsuccinate; dimethylthiolate; methyl salicylate; dimethyl salicylate; dimethylsuccinate; t-butylhydroperoxide; and combinations thereof. When used, a hydrolyzable ester is included in the liquid hardening agent component in an amount in the range of from about 0.1% to about 3% by weight of the liquid hardening agent component. In some embodiments a hydrolyzable ester is included in the liquid hardening agent component in an amount in the range of from about 1% to about 2.5% by weight of the liquid hardening agent component.

Use of a diluent or liquid carrier fluid in the hardenable resin composition is optional and may be used to reduce the viscosity of the hardenable resin component for ease of handling, mixing and transferring. Any suitable carrier fluid that is compatible with the hardenable resin and achieves the desired viscosity effects is suitable for use in the present invention. Some suitable liquid carrier fluids are those having high flash points (e.g., about 125° F.) because of, among other things, environmental and safety concerns; such solvents include, but are not limited to, butyl lactate, butylglycidyl ether, dipropylene glycol methyl ether, dipropylene glycol dimethyl ether, dimethyl formamide, diethyleneglycol methyl ether, ethyleneglycol butyl ether, diethyleneglycol butyl ether, propylene carbonate, methanol, butyl alcohol, d'limonene, fatty acid methyl esters, and combinations thereof. Other suitable liquid carrier fluids include aqueous dissolvable solvents such as, for example, methanol, isopropanol, butanol, glycol ether solvents, and combinations thereof. Suitable glycol ether liquid carrier fluids include, but are not limited to, diethylene glycol methyl ether, dipropylene glycol methyl ether, 2-butoxy ethanol, ethers of a $C_2$ to $C_6$ dihydric alkanol having at least one $C_1$ to $C_6$ alkyl group, mono ethers of dihydric alkanols, methoxypropanol, butoxyethanol, hexoxyethanol, and isomers thereof. Selection of an appropriate liquid carrier fluid is dependent on, inter alia, the resin composition chosen.

Another resin suitable for use in the methods of the present invention are furan-based resins. Suitable furan-based resins include, but are not limited to, furfuryl alcohol resins, mixtures furfuryl alcohol resins and aldehydes, and a mixture of furan resins and phenolic resins. Of these, furfuryl alcohol resins are preferred. A furan-based resin may be combined with a solvent to control viscosity if desired. Suitable solvents for use in the furan-based consolidation fluids of the present invention include, but are not limited to 2-butoxy ethanol, butyl lactate, butyl acetate, tetrahydrofurfuryl methacrylate, tetrahydrofurfuryl acrylate, esters of oxalic, maleic and succinic acids, and furfuryl acetate. Of these, 2-butoxy ethanol is preferred.

Still another resin suitable for use in the methods of the present invention is a phenolic-based resin. Suitable phenolic-based resins include, but are not limited to, terpolymers of phenol, phenolic formaldehyde resins, and a mixture of phenolic and furan resins. Of these, a mixture of phenolic and furan resins is preferred. A phenolic-based resin may be combined with a solvent to control viscosity if desired. Suitable solvents for use in the phenolic-based consolidation fluids of the present invention include, but are not limited to butyl acetate, butyl lactate, furfuryl acetate, and 2-butoxy ethanol. Of these, 2-butoxy ethanol is preferred.

Yet another resin-type coating material suitable for use in the methods of the present invention is a phenol/phenol formaldehyde/furfuryl alcohol resin comprising from about 5% to about 30% phenol, from about 40% to about 70% phenol formaldehyde, from about 10 to about 40% furfuryl alcohol, from about 0.1% to about 3% of a silane coupling agent, and from about 1% to about 15% of a surfactant. In the phenol/phenol formaldehyde/furfuryl alcohol resins suitable for use in the methods of the present invention, suitable silane coupling agents include, but are not limited to, N-2-(aminoethyl)-3-aminopropyltrimethoxysilane, 3-glycidoxypropyltrimethoxysilane, and n-beta-(aminoethyl)-gamma-aminopropyltrimethoxysilane. Suitable surfactants include, but are not limited to, an ethoxylated nonyl phenol phosphate ester, mixtures of one or more cationic surfactants, and one or more non-ionic surfactants and an alkyl phosphonate surfactant.

2. Suitable Types of Surfactants

Surfactants suitable for use in the present invention are those capable of emulsifying an oil based component in a water-based component so that the emulsion has a water external phase and an oil internal phase. A preferred surfactant is an amine surfactant. Such preferred amine surfactants include, but are not limited to, amine ethoxylates and amine ethoxylated quaternary salts such as tallow diamine and tallow triamine exthoxylates and quaternary salts. Examples of suitable surfactants are ethoxylated $C_{12}$-$C_{22}$ diamine, ethoxylated $C_{12}$-$C_{22}$ triamine, ethoxylated $C_{12}$-$C_{22}$ tetraamine, ethoxylated $C_{12}$-$C_{22}$ diamine methylchloride quat, ethoxylated $C_{12}$-$C_{22}$ triamine methylchloride quat, ethoxylated $C_{12}$-$C_{22}$ tetraamine methylchloride quat, ethoxylated $C_{12}$-$C_{22}$ diamine reacted with sodium chloroacetate, ethoxylated $C_{12}$-$C_{22}$ triamine reacted with sodium chloroacetate, ethoxylated $C_{12}$-$C_{22}$ tetraamine reacted with sodium chloroacetate, ethoxylated $C_{12}$-$C_{22}$ diamine acetate salt, ethoxylated $C_{12}$-$C_{22}$ diamine hydrochloric acid salt, ethoxylated $C_{12}$-$C_{22}$ diamine glycolic acid salt, ethoxylated $C_{12}$-$C_{22}$ diamine DDBSA salt, ethoxylated $C_{12}$-$C_{22}$ triamine acetate salt, ethoxylated $C_{12}$-$C_{22}$ triamine hydrochloric acid salt, ethoxylated $C_{12}$-$C_{22}$ triamine glycolic acid salt, ethoxylated $C_{12}$-$C_{22}$ triamine DDBSA salt, ethoxylated $C_{12}$-$C_{22}$ tetraamine acetate salt, ethoxylated $C_{12}$-$C_{22}$ tetraamine hydrochloric acid salt, ethoxylated $C_{12}$-$C_{22}$ tetraamine glycolic acid salt, ethoxylated $C_{12}$-$C_{22}$ tetraamine DDBSA salt, pentamethylated $C_{12}$-$C_{22}$ diamine quat, heptamethylated $C_{12}$-$C_{22}$ diamine quat, nonamethylated $C_{12}$-$C_{22}$ diamine quat, and combinations thereof.

In some embodiments of the present invention the amine surfactant may have the general formula:

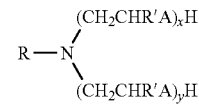

wherein R is a $C_{12}$-$C_{22}$ aliphatic hydrocarbon; R' is independently selected from hydrogen or $C_1$ to $C_3$ alkyl group; A is NH or O, and x+y has a value greater than or equal to one but also less than or equal to three. Preferably the R group is a non-cyclic aliphatic. In some embodiments the R group contains at least one degree of unsaturation that is to say at least one carbon-carbon double bond. In other embodiments the R group may be a commercially recognized mixture of aliphatic hydrocarbons such as soya, which is a mixture of $C_{14}$ to $C_{20}$ hydrocarbons, or tallow which is a mixture of $C_{16}$ to $C_{20}$ aliphatic hydrocarbons, or tall oil which is a mixture of $C_{14}$ to $C_{18}$ aliphatic hydrocarbons. In other embodiments, one in which the A group is NH, the value of x+y is preferably two with x having a preferred value of one. In other embodiments in which the A group is O, the preferred value of x+y is two with the value of x being preferably one. One example of a commercially available amine surfactant is TER 2168 Series available from Champion Chemicals located in Fresno, Tex. Other commercially available examples include Ethomeen T/12 a diethoxylated tallow amine; Ethomeen S/12 a diethoxylated soya amine; Duomeen O a N-oleyl-1,3-diaminopropane, Duomeen T a N-tallow-1,3-diaminopropane, all of which are available from Akzo Nobel.

In other embodiments, the surfactant is a tertiary alkyl amine ethoxylate (a cationic surfactant). Triton RW-100 surfactant (X and Y=10 moles of ethylene oxide) and Triton RW-150 surfactant (X and Y=15 moles of ethylene oxide) are examples of tertiary alkyl amine ethoxylates that may be purchased from Dow Chemical Company.

In other embodiments, the surfactant is a combination of an amphoteric surfactant and an anionic surfactant. The relative amounts of the amphoteric surfactant and the anionic surfactant in the surfactant mixture are from about 30 to about 45% by weight of the surfactant mixture and from about 55 to about 70% by weight of the surfactant mixture, respectively. The amphoteric surfactant may be lauryl amine oxide, a mixture of lauryl amine oxide and myristyl amine oxide (i.e., a lauryl/myristyl amine oxide), cocoamine oxide, lauryl betaine, oleyl betaine, or combinations thereof, with the lauryl/myristyl amine oxide being preferred. The cationic surfactant may be cocoalkyltriethyl ammonium chloride, hexadecyltrimethyl ammonium chloride, or combinations thereof, with a 50/50 mixture by weight of the cocoalkyltriethyl ammonium chloride and the hexadecyltrimethyl ammonium chloride being preferred.

In yet other embodiments, the surfactant is a nonionic surfactant. Such preferred nonionic surfactants include, but are not limited to, alcohol oxylalkylates, alkyl phenol oxylalkylates, nonionic esters such as sorbitan esters and alkoxylates of sorbitan esters. Examples of suitable surfactants include but are not limited to, castor oil alkoxylates, fatty acid alkoxylates, lauryl alcohol alkoxylates, nonylphenol alkoxylates, octylphenol alkoxylates, tridecyl alcohol alkoxylates, such as POE-10 nonylphenol ethoxylate, POE-100 nonylphenol ethoxylate, POE-12 nonylphenol ethoxylate, POE-12 octylphenol ethoxylate, POE-12 tridecyl alcohol ethoxylate, POE-14 nonylphenol ethoxylate, POE-15 nonylphenol ethoxylate, POE-18 tridecyl alcohol ethoxylate, POE-20 nonylphenol ethoxylate, POE-20 oleyl alcohol ethoxylate, POE-20 stearic acid ethoxylate, POE-3 tridecyl alcohol ethoxylate, POE-30 nonylphenol ethoxylate, POE-30 octylphenol ethoxylate, POE-34 nonylphenol ethoxylate, POE-4 nonylphenol ethoxylate, POE-40 castor oil ethoxylate, POE-40 nonylphenol ethoxylate, POE-40 octylphenol ethoxylate, POE-50 nonylphenol ethoxylate, POE-50 tridecyl alcohol ethoxylate, POE-6 nonylphenol ethoxylate, POE-6 tridecyl alcohol ethoxylate, POE-8 nonylphenol ethoxylate, POE-9 octylphenol ethoxylate, mannide monooleate, sorbitan isostearate, sorbitan laurate, sorbitan monoisostearate, sorbitan monolaurate, sorbitan monooleate, sorbitan monopalmitate, sorbitan monostearate, sorbitan oleate, sorbitan palmitate, sorbitan sesquioleate, sorbitan stearate, sorbitan trioleate, sorbitan tristearate, POE-20 sorbitan monoisostearate ethoxylate, POE-20 sorbitan monolaurate ethoxylate, POE-20 sorbitan monooleate ethoxylate, POE-20 sorbitan monopalmitate ethoxylate, POE-20 sorbitan monostearate ethoxylate, POE-20 sorbitan trioleate ethoxylate, POE-20 sorbitan tristearate ethoxylate, POE-30 sorbitan tetraoleate ethoxylate, POE-40 sorbitan tetraoleate ethoxylate, POE-6 sorbitan hexastearate ethoxylate, POE-6 sorbitan monstearate ethoxylate, POE-6 sorbitan tetraoleate ethoxylate, and/or POE-60 sorbitan tetrastearate ethoxylate. Preferred nonionic surfactants include alcohol oxyalyalates such as POE-23 lauryl alcohol and alkyl phenol ethoxylates such as POE (20) nonyl phenyl ether. Other applicable nonionic surfactants are esters such as sorbitan monooleate.

While cationic, amphoteric, and nonionic surfactants are preferred, any suitable emulsifying surfactant can be used. Good surfactants for emulsification typically need to be either ionic to give charge stabilization or have long groups for steric stability in water. This would include other cationic surfactants and even anionic surfactants. Examples include, but are not limited to, hexahydro-1,3,5-tris(2-hydroxyethyl) triazine, alkyl ether phosphate, ammonium lauryl sulfate, ammonium nonylphenol ethoxylate sulfate, branched isopropyl amine dodecylbenzene sulfonate, branched sodium dodecylbenzene sulfonate, dodecylbenzene sulfonic acid, branched dodecylbenzene sulfonic acid, fatty acid sulfonate potassium salt, phosphate esters, POE-1 ammonium lauryl ether sulfate, OE-1 sodium lauryl ether sulfate, POE-10 nonylphenol ethoxylate phosphate ester, POE-12 ammonium lauryl ether sulfate, POE-12 linear phosphate ester, POE-12 sodium lauryl ether sulfate, POE-12 tridecyl alcohol phosphate ester, POE-2 ammonium lauryl ether sulfate, POE-2 sodium lauryl ether sulfate, POE-3 ammonium lauryl ether sulfate, POE-3 disodium alkyl ether sulfosuccinate, POE-3 linear phosphate ester, POE-3 sodium lauryl ether sulfate, POE-3 sodium octylphenol ethoxylate sulfate, POE-3 sodium tridecyl ether sulfate, POE-3 tridecyl alcohol phosphate ester, POE-30 ammonium lauryl ether sulfate, POE-30 sodium lauryl ether sulfate, POE-4 ammonium lauryl ether sulfate, POE-4 ammonium nonylphenol ethoxylate sulfate, POE-4 nonyl phenol ether sulfate, POE-4 nonylphenol ethoxylate phosphate ester, POE-4 sodium lauryl ether sulfate, POE-4 sodium nonylphenol ethoxylate sulfate, POE-4 sodium tridecyl ether sulfate, POE-50 sodium lauryl ether sulfate, POE-6 disodium alkyl ether sulfosuccinate, POE-6 nonylphenol ethoxylate phosphate ester, POE-6 tridecyl alcohol phosphate ester, POE-7 linear phosphate ester, POE-8 nonylphenol ethoxylate phosphate ester, potassium dodecylbenzene sulfonate, sodium 2-ethyl hexyl sulfate, sodium alkyl ether sulfate, sodium alkyl sulfate, sodium alpha olefin sulfonate, sodium decyl sulfate, sodium dodecylbenzene sulfonate, sodium lauryl sulfate, sodium lauryl sulfoacetate, sodium nonylphenol ethoxylate sulfate, and/or sodium octyl sulfate.

The surfactant is preferably present in the consolidating agent emulsion in an amount in the range from about 0.1% to 10% by weight of the composition.

3. Optional Additives

Optionally, the consolidating agent emulsions of the present invention may comprise additional additives such as emulsion stabilizers, emulsion destabilizers, antifreeze agents, and clay stabilizers. For instance, an emulsion stabilizer may be beneficial when stability of the emulsion is desired for a lengthened period of time or at specified temperatures. The emulsion stabilizer may be any acid but preferably organic acid and more preferably acetic acid. If an emulsion stabilizer is utilized, it is preferably present in an amount in the range from about 0.1% to 5% by weight of the consolidating agent emulsion composition. An emulsion destabilizer may be beneficial when stability of the emulsion is not desired. The emulsion destabilizer may be, inter alia, an alcohol, a pH additive, a surfactant or an oil. If an emulsion destabilizer is utilized, it is preferably present in an amount necessary to break the emulsion. Additionally, antifreeze agents may be beneficial to improve the freezing point of the emulsion. One of the ordinary skill in the art with the benefit of this disclosure will recognize that the compatibility of any given additive should be tested to ensure that it does not adversely affect the performance of the consolidating agent emulsion.

B. Methods of Use

The consolidating agent emulsions of the present invention may be used in any suitable well treatment in which it is desirable to control particulate migration and/or modify the stress-activated reactivity of subterranean fracture faces and other surfaces in subterranean formations. These methods can be performed at any time during the life of the well.

One example of a method of the present invention comprises the steps of: providing a consolidating agent emulsion that comprises an aqueous fluid, a surfactant, and a consolidating agent; and coating at least a plurality of particulates with the consolidating agent emulsion to produce a plurality of consolidating agent coated particulates. These consolidating agent coated particulates may then be used downhole, for example, in a fracturing or a gravel packing operation. The term "coated particulate" as used herein means particulates that have been at least partially coated with a process comprising a consolidating agent emulsion of the present invention. The particulates may be coated by any suitable method as recognized by one skilled in the art with the benefit of this disclosure. The term "coated" does not imply any particular degree of coverage of the particulates with a consolidating agent.

In other embodiments, the present invention provides a method comprising providing a treatment fluid that comprises a consolidating agent emulsion that comprises an aqueous fluid, a surfactant, and a consolidating agent; and introducing the treatment fluid into a subterranean formation. The consolidating agent emulsion may then control particulate migration by allowing the consolidating agent to consolidate at least a portion of an unconsolidated subterranean formation.

In other embodiments, the present invention provides a method comprising providing a treatment fluid that comprises at least a plurality of particulates coated with a consolidating agent emulsion that comprises an aqueous fluid, a surfactant, and a consolidating agent; introducing the treatment fluid into a subterranean formation; and allowing the consolidating agent to interact with at least a portion of a mineral surface to modify the stress-activated reactivity of at least a portion of a mineral surface in the subterranean formation.

In some embodiments, the consolidating agent emulsions of the present invention may be used, inter alia, in primary, remedial, or proactive methods. Whether a particular method of this invention is "primary," "remedial," or "proactive" is determined relative to the timing of a fracturing treatment or a gravel packing treatment. A primary method of the present invention may involve using the consolidating agent emulsions of the present invention in conjunction with a fracturing fluid or a gravel pack fluid (e.g., as a component of the fracturing fluid or a gravel pack fluid so that the consolidating agent emulsions of the present invention are introduced into the subterranean formation with the fluid). The remedial methods may be used in wells wherein a portion of the well has been fractured and propped. The remedial methods also may be used in a gravel packing situation, for example where there has been a screen problem or failure. The proactive methods may be used in wells that have not yet been fractured or gravel packed. The proactive methods can be performed in conjunction with a fracturing treatment, for example, as a pre-pad to the fracturing treatment or in any diagnostic pumping stage performed before a fracturing, gravel packing, or acidizing procedure.

One of ordinary skill in the art will recognize that the present invention may be useful to stabilize other types of particulates, such as the coatings (also referred to as "grapeskin") left over from some encapsulated materials.

Below are some additional examples of some of the primary, remedial, and proactive methods of the present invention.

1. Primary Methods

In some embodiments, the consolidating agent emulsions of the present invention may be used in a primary method with a well treatment fluid, such as a fracturing fluid or a gravel pack fluid. One example of such a method comprises: providing a fracturing fluid that comprises a consolidating agent emulsion comprising an aqueous fluid, a surfactant, and a consolidating agent; placing the fracturing fluid into a subterranean formation at a pressure sufficient to create or enhance a fracture therein; and allowing the consolidating agent to at least partially consolidate particulates within a portion of the subterranean formation.

The fracturing fluids in these primary embodiments may comprise those things usually found in fracturing fluids including, but not limited to, an aqueous base fluid, proppant particulates, gelling agents, surfactants, breakers, buffers, a gas phase (if the fracturing fluid is foamed or commingled), coupling agents, and the like.

One example of a primary gravel pack method of the present invention comprises: providing a gravel pack fluid that comprises gravel and a consolidating agent emulsion composition, the consolidating agent emulsion composition comprising an aqueous fluid, a surfactant, and a consolidating agent; contacting the portion of the subterranean formation with the gravel pack fluid so as to place a gravel pack in or near a portion of the subterranean formation; and allowing the consolidating agent to stabilize particulates within the subterranean formation. The gravel pack fluids used in these embodiments may be any suitable gravel pack fluid, and it may comprise those things usually found in gravel pack fluids including, but not limited to, an aqueous base fluid, gravel particulates, gelling agents, surfactants, breakers, buffers, a gas phase (if the fluid is foamed or commingled), and the like.

2. Remedial Measures

In some remedial embodiments of the present invention, after a fracturing treatment or a gravel pack treatment has been performed, the consolidating agent emulsions of the present invention may be introduced into an unconsolidated zone of a subterranean formation to stabilize particulates within the zone. The consolidating agent emulsions may disperse any loose fines within a proppant pack in a fracture, move any fines away from the fracture (or near well bore), stabilize gravel particulates around a screen, stabilize a screen failure, and lock the fines in the formation without causing damage to the permeability of the formation.

3. The Proactive Methods

The proactive methods of the present invention are most suited for wells that have not been fractured or gravel packed yet. These methods can be used as a pre-treatment before a fracturing treatment or at the early stage of a fracturing treatment (including diagnostic pumping) as a pre-pad treatment.

In some embodiments, the proactive methods of the present invention comprise placing the consolidating agent emulsions before or as part of a pre-pad of a fracturing treatment into a subterranean formation. The second step involves fracturing a portion of the subterranean formation. This fracturing step may include the introduction of a plurality of particulates into the formation. At least a portion of the particulates may be coated with a consolidating agent. In some embodiments, the coated particulates may be introduced into the fluid at the end of the fracturing treatment. The third step involves introducing particulates during the fracturing treatment into the fractures created in the fracturing treatment. The particulates may form proppant packs in the fractures. In certain embodiments, all three steps may be performed with a single fluid.

4. Introducing Coated Particulates

In some embodiments, the consolidating agent emulsions of the present invention may be coated on particulates to be used in a fracturing or gravel packing process like those described above. The resultant coated particulates may be introduced as part of a fracturing or gravel packing process, at any point during one of the methods described above. Preferably, the coated particulate is introduced towards the end of a fracturing or gravel packing treatment so that the maximum economic benefit can be obtained.

In accordance with the methods and compositions of the present invention, all or part of the particulate transported into the fractures is coated (preferably on-the-fly) with a consolidating agent using the consolidating agent emulsions of the present invention and may then be suspended in a fracturing fluid or used as part of a gravel packing process. The consolidating agent emulsions are used to coat the consolidating agent on dry particulates while the particulates are conveyed in a conveying and/or mixing device. The amount of consolidating agent coated on the particulates is in the range from about 0.1% to about 20% by weight of the particulate, with about 1-5% being preferred.

The term "on-the-fly" is used herein to mean that a flowing stream is continuously introduced into another flowing stream so that the streams are combined and mixed while continuing to flow as a single stream. The coating of the dry particulates with the consolidating agent emulsions and any mixing of the consolidating agent coated particulates with a fracturing fluid or treatment fluid are all preferably accomplished on-the-fly. However, as is well understood by those skilled in the art, such mixing can also be accomplished by batch mixing or partial batch mixing.

A wide variety of particulate materials may be used in accordance with the present invention, including, but not limited to, sand, bauxite, ceramic materials, glass materials, resin precoated proppant (e.g., commercially available from Borden Chemicals and Santrol, for example, both from Houston, Tex.), polymer materials, "TEFLON™" (tetrafluoroethylene) materials, nut shells, ground or crushed nut shells, seed shells, ground or crushed seed shells, fruit pit pieces, ground or crushed fruit pits, processed wood, composite particulates prepared from a binder with filler particulate including silica, alumina, fumed carbon, carbon black, graphite, mica, titanium dioxide, meta-silicate, calcium silicate, kaolin, talc, zirconia, boron, fly ash, hollow glass microspheres, and solid glass; or mixtures thereof. The particulate material used may have a particle size in the range of from about 2 to about 400 mesh, U.S. Sieve Series. Preferably, the particulate material is graded sand having a particle size in the range of from about 10 to about 70 mesh, U.S. Sieve Series. Preferred sand particle size distribution ranges are one or more of 10-20 mesh, 20-40 mesh, 40-60 mesh or 50-70 mesh, depending on the particle size and distribution of the formation particulates to be screened out by the particulate materials.

To facilitate a better understanding of the present invention, the following examples of certain aspects of some embodiments are given. In no way should the following examples be read to limit, or define, the entire scope of the invention.

Example 1

Diagenesis tests were performed using 3-in. diameter radial API conductivity cells fitted with Ohio sandstone core wafers on the top and bottom of the proppant pack. Alumina-based proppant loading of 2 lb/ft² was used for the proppant pack, with 2% KCl as the fluid medium. Sample proppant pack No. 1 contained untreated proppant and Sample proppant pack No. 2 contained proppant that was coated using the consolidating agent emulsions of the present invention.

Figure 2:
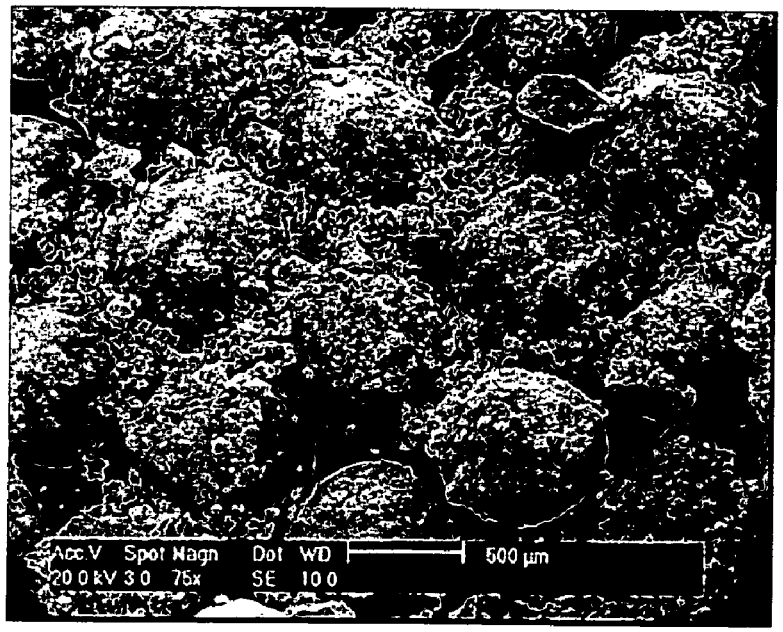
FIG. 2 is a microscopy image of untreated proppant particulates after being subjected to a stress load of 10,000 psi at 250° F.
Figure 3:
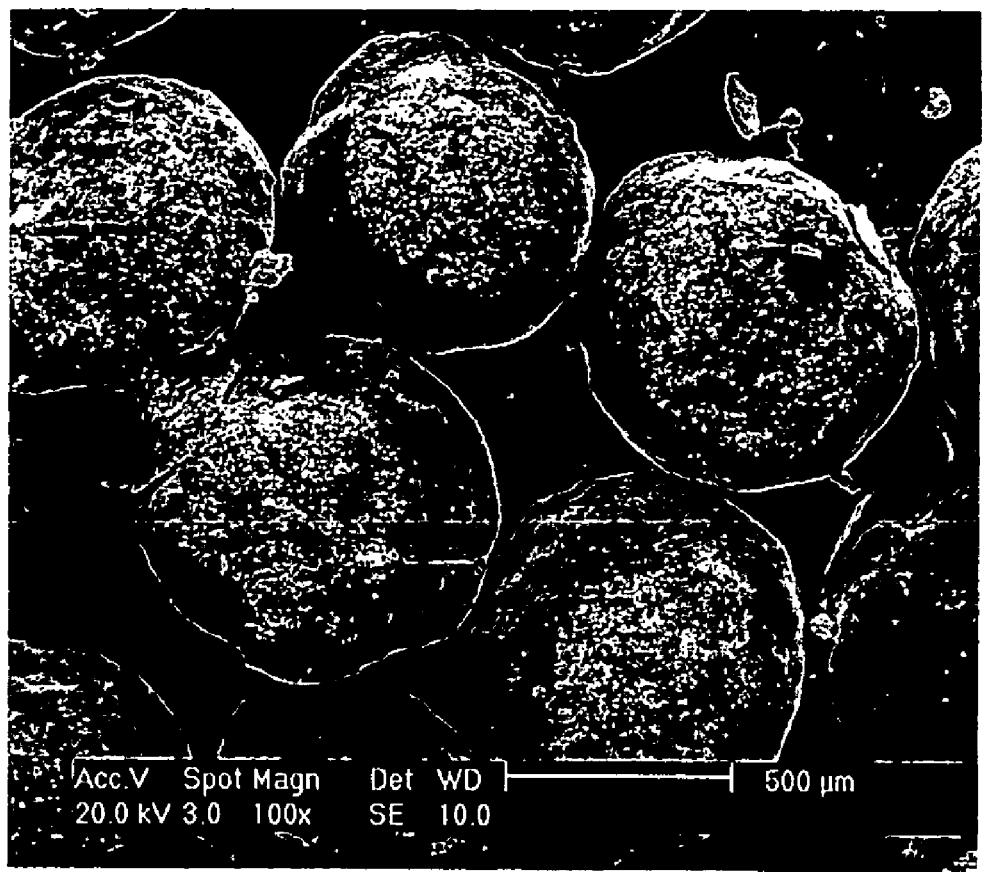
FIG. 3 is a microscopy image of proppant particulates that have been treated with a consolidating agent emulsion in accordance with an embodiment of the present invention after being subjected to a stress load of 10,000 psi at 250° F.

After preparation, each sample was subjected to a stress load of 10,000 psi at 250° F. for 126 hours in static conditions. The API conductivity cell was then disassembled, and the Ohio sandstone wafers were examined to determine proppant particulate embedment by optical microscopy. For each sample, the proppant layer next to the Ohio sandstone wafer and the center of the proppant pack were examined by Environmental Scanning Electron Microscope. FIG. 1 is a microscopy image of proppant particulates used in each sample before exposure to the stress load and temperatures. FIG. 2 is a microscopy image of Sample proppant pack No. 1, containing untreated proppant particulates, after being exposed to the stress load and temperatures. FIG. 3 is a microscopy image of Sample proppant pack No. 2, containing proppant particulates that were coated using the consolidating agent emulsions of the present invention, after being exposed to the stress load and temperatures.

Electron dispersive X-ray (EDX) was also used to determine the silica-to-aluminum ratio in various areas of Sample proppant pack No. 1. The silica-to-aluminum ratio observed for the proppant was 0.9, as is typical for ceramic proppant, while that for the Ohio sandstone was 8.4. The porosity filling precipitate was found to be 4.9, or an intermediate concentration of these metals. The silica-to-aluminum ratio was not measured in Sample proppant pack No. 2 because the porosity filling precipitate was not found in the pack.

Thus, by treating the proppant pack with the consolidating agent emulsions of the present invention, diagenesis was reduced and the porosity filling precipitate was eliminated from the pack.

Example 2

Conductivity tests were performed by preparing 5-lb/ft² proppant packs of 20/40-mesh ceramic proppant. Sample proppant pack No. 3 and Sample proppant pack No. 4 were each separately placed between two unconsolidated silica wafers, which were used to simulate unconsolidated formation faces of a soft formation. Each sample proppant pack and the two unconsolidated silica wafers were then placed between two Ohio sandstone core wafers and placed in a linear API conductivity cell.

The two cells were then brought to an initial stress of 2,000 psi and 180° F. Sample proppant pack No. 3 was then treated with only 3% KCl and Sample proppant pack No. 4 was treated with the consolidating agent emulsions of the present invention. Both treatments were performed by injecting the proppant pack with 3 pore volumes of the treatment fluid. Flow was then initiated through each Sample proppant pack in the conventional linear direction to determine the initial conductivity of each of the Sample proppant packs at 2,000 psi closure stress. After stable flow was achieved, flow at a rate of 2 mL/min was initiated through the wafers to simulate production from the formation into the fracture. The effluent fluid was then captured to examine for fines production.

Sample proppant pack No. 3 failed with the continuous flow from the silica wafers into the proppant pack. This failure resulted in the fines exiting the test cell, thereby causing the overall width to collapse. The collapse was caused by the flow removing the fines that make up the wafer and transporting them through the proppant pack and out of the cell. After the failure of the proppant pack, all flow was stopped for this test cell. Differential pressure for the conductivity measurement increased beyond the capacity of the sensor because of the fines invasion into the pack. Therefore, no subsequent values were obtained for Sample proppant pack No. 3.

Sample proppant pack No. 4 continued to allow inflow through the silica wafers without failure or collapse of the overall width. After reaching stable conductivity measurements at 2,000 psi closure, the stress load was increased to 4,000 psi closure. Again, after reaching stable conductivity measurements, the stress load was decreased back to 2,000 psi closure. This stress cycle was repeated several times with a doubling in inflow rate with each cycle to try to destabilize the pack.

Conductivity results for Sample proppant pack No. 3 and Sample proppant pack No. 4 are shown in Table 1 below.

TABLE 1

| Time (hr) | Closure Stress (psi) | Inflow Rate (cc/min) | Conductivity (mD-ft) for Sample proppant pack No. 3 | Conductivity (mD-ft) for Sample proppant pack No. 3 |
| --- | --- | --- | --- | --- |
| 0 | 2000 | 2 | 13787 | 12435 |
| 20 | 2000 | 2 | 2 | 11089 |
| 43 | 2000 | 2 | — | 11362 |
| 67 | 2000 | 2 | — | 12283 |
| 95 | 4000 | 4 | — | 11708 |
| 139 | 4000 | 4 | — | 11540 |
| 164 | 2000 | 2 | — | 11822 |
| 187 | 2000 | 2 | — | 11905 |
| 235 | 2000 | 2 | — | 11504 |
| 307 | 4000 | 4 | — | 11166 |
| 332 | 2000 | 2 | — | 11756 |
| 355 | 2000 | 2 | — | 11327 |

Thus, Example 2 demonstrates, inter alia, that the consolidating agent emulsions of the present invention may effective control or mitigate the invasion of formation fines into the proppant and may allow the proppant pack to maintain conductivity.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. In particular, every range of values (of the form, "from about a to about b," or, equivalently, "from approximately a to b," or, equivalently, "from approximately a-b") disclosed herein is to be understood as referring to the power set (the set of all subsets) of the respective range of values, and set forth every range encompassed within the broader range of values. Also, the terms in the claims have their plain, ordinary meaning unless otherwise explicitly and clearly defined by the patentee.

What is claimed is:

1. A method comprising the steps of:
providing a consolidating agent emulsion composition that comprises an aqueous fluid, a surfactant, and a non-aqueous tackifying agent, wherein the consolidating agent emulsion composition comprises an aqueous external phase and an oil internal phase, and wherein the consolidating agent emulsion does not include a tertiary amine surfactant; and
coating at least a plurality of particulates with the consolidating agent emulsion to produce a plurality of consolidating agent emulsion coated particulates.

2. The method of claim 1 further comprising the steps of placing the consolidating agent emulsion coated particulates into a fracturing fluid; and placing the fracturing fluid into a subterranean formation at a pressure sufficient to create or enhance at least one or more fractures therein.

3. The method of claim 1 wherein the surfactant is present in the consolidating agent emulsion composition in an amount in the range from about 0.1% to about 10% by weight of the consolidating agent emulsion composition.

4. The method of claim 1 wherein the non-aqueous tackifying agent is present in the consolidating agent emulsion composition in an amount in the range from about 15% to about 50% by weight of the consolidating agent emulsion composition.

5. The method of claim 1 wherein the consolidating agent emulsion composition further comprises an emulsion stabilizer.

6. The method of claim 1 wherein the non-aqueous tackifying agent comprises at least one non-aqueous tackifying agent selected from the group consisting of a polyamide, a polyester, a polycarbonate, a polycarbamate, a natural resin, and a combination thereof.

7. The method of claim 1 wherein the consolidating agent further comprises a furfuryl alcohol resin.

8. A method comprising the steps of:
providing a treatment fluid comprising a consolidating agent emulsion composition that comprises an aqueous fluid, a surfactant, and a non-aqueous tackifying agent, wherein the consolidating agent emulsion composition comprises an aqueous external phase and an oil internal phase, and wherein the consolidating agent emulsion does not include a tertiary amine surfactant; and
introducing the treatment fluid into a subterranean formation.

9. The method of claim 8 further comprising the step of allowing the consolidating agent to modify the stress-activated reactivity of at least a portion of a mineral surface in the subterranean formation.

10. The method of claim 8 wherein the surfactant is present in the consolidating agent emulsion composition in an amount in the range from about 0.1% to about 10% by weight of the consolidating agent emulsion composition.

11. The method of claim 8 wherein the non-aqueous tackifying agent is present in the consolidating agent emulsion composition in an amount in the range from about 15% to about 50% by weight of the consolidating agent emulsion composition.

12. The method of claim 8 wherein the non-aqueous tackifying agent comprises at least one non-aqueous tackifying agent selected from the group consisting of a polyamide, a polyester, a polycarbonate, a polycarbamate, a natural resin, and a combination thereof.

13. The method of claim 8 wherein the consolidating agent further comprises is a furfuryl alcohol resin.

14. The method of claim 8 wherein the treatment fluid is a fracturing fluid, the method further comprising placing the fracturing fluid into a subterranean formation at a pressure sufficient to create or enhance at least one or more fractures therein.

* * * * *